United States Patent [19]
Yamashita et al.

[11] Patent Number: 5,422,748
[45] Date of Patent: Jun. 6, 1995

[54] LIQUID CRYSTAL DEVICE AND DISPLAY APPARATUS

[75] Inventors: Masataka Yamashita, Hiratsuka; Kazuharu Katagiri, Tama; Shosei Mori, Atsugi, all of Japan

[73] Assignee: Canon Kabushiki Kaisha, Tokyo, Japan

[21] Appl. No.: 979,283

[22] Filed: Nov. 20, 1992

[30] Foreign Application Priority Data

Nov. 22, 1991 [JP] Japan .................... 3-307795
Oct. 26, 1992 [JP] Japan .................... 4-287752

[51] Int. Cl.$^6$ .................... G02F 1/13; C09K 19/34; C09K 19/56
[52] U.S. Cl. .................... 359/75; 359/103; 252/299.61; 252/299.4
[58] Field of Search .................... 359/104, 106, 63, 64, 359/75, 68; 252/299.61, 299.4

[56] References Cited

U.S. PATENT DOCUMENTS

| | | | |
|---|---|---|---|
| 4,367,924 | 1/1983 | Clark et al. | 359/56 X |
| 4,581,619 | 4/1986 | Mizutome et al. | 346/160 |
| 4,639,089 | 1/1987 | Okada et al. | 359/76 X |
| 4,714,323 | 12/1987 | Katagiri et al. | 359/104 X |
| 4,775,225 | 10/1988 | Tsuboyama | 359/76 X |
| 4,778,259 | 10/1988 | Kitayama et al. | 359/76 X |
| 4,812,259 | 3/1989 | Yoshinaga et al. | 252/299.65 |
| 4,820,026 | 4/1989 | Okada et al. | 359/78 X |
| 4,834,904 | 5/1989 | Krause et al. | 252/299.01 |
| 4,844,597 | 7/1989 | Katagiri et al. | 359/104 X |
| 4,856,875 | 8/1989 | Kozaki et al. | 359/103 X |

(List continued on next page.)

FOREIGN PATENT DOCUMENTS

| | | |
|---|---|---|
| 107216 | 8/1981 | Japan . |
| 193426 | 11/1984 | Japan . |
| 193427 | 11/1984 | Japan . |
| 31120 | 2/1985 | Japan . |
| 156046 | 8/1985 | Japan . |
| 156047 | 8/1985 | Japan . |
| 140198 | 6/1989 | Japan . |

OTHER PUBLICATIONS

Nagano et al., Jpn. J. Appl. Phys., vol. 19, No. 10 (1980) 2013:14.
Ouchi et al., Jpn. J. Appl. Phys., vol. 27, No. 5 (1988) L725:8.

*Primary Examiner*—C. Harris
*Attorney, Agent, or Firm*—Fitzpatrick, Cella, Harper & Scinto

[57] ABSTRACT

A liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the liquid crystal shows a pretilt angle $\alpha$, a cone angle $\text{(H)}$, an inclination angle $\delta$ of SmC* layer, and an apparent tilt angle $\theta$ a satisfying relationships of: $\text{(H)} < \alpha + \delta$ and $\text{(H)} > \theta a > \text{(H)}/2$; and the ferroelectric liquid crystal comprises at least three mesomorphic compounds represented by the following formula (I):

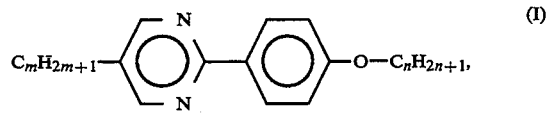

wherein m and n are an integer of 6 to 12, said at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic liquid.

25 Claims, 9 Drawing Sheets

U.S. PATENT DOCUMENTS

| | | | |
|---|---|---|---|
| 4,984,873 | 1/1991 | Takiguchi et al. | 359/63 X |
| 5,007,716 | 4/1991 | Hanyu et al. | 359/104 X |
| 5,076,671 | 12/1991 | Uchimi et al. | 359/56 |
| 5,114,613 | 5/1992 | Yoshinaga et al. | 252/299.61 |
| 5,151,214 | 9/1992 | Koden et al. | 252/299.61 |
| 5,167,857 | 12/1992 | Yoshinaga et al. | 252/299.61 |
| 5,173,211 | 12/1992 | Yamashita et al. | 252/299.61 |
| 5,183,586 | 2/1993 | Terada et al. | 252/299.61 |
| 5,186,858 | 2/1993 | Terada et al. | 252/299.61 |
| 5,200,108 | 4/1993 | Yuasa et al. | 252/299.01 |
| 5,213,709 | 5/1993 | Takiguchi et al. | 252/299.61 |
| 5,214,523 | 5/1993 | Nito et al. | 359/100 |
| 5,237,440 | 8/1993 | Watanabe et al. | 359/90 |
| 5,240,638 | 8/1993 | Kikuchi et al. | 252/299.61 |
| 5,244,599 | 2/1994 | Iwaki et al. | 252/299.61 |
| 5,292,453 | 3/1994 | Shinjo et al. | 252/299.61 |

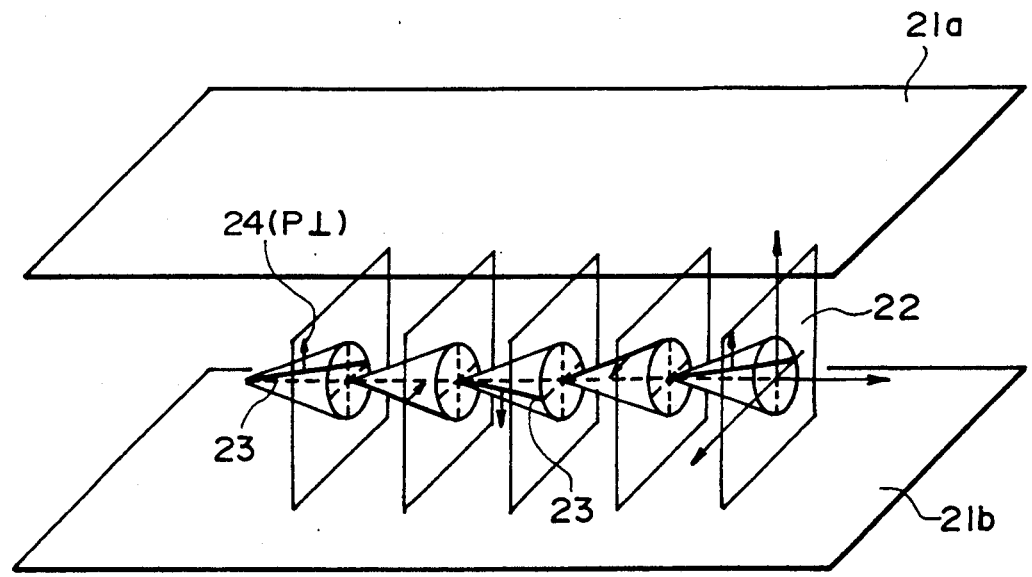
F I G. 2
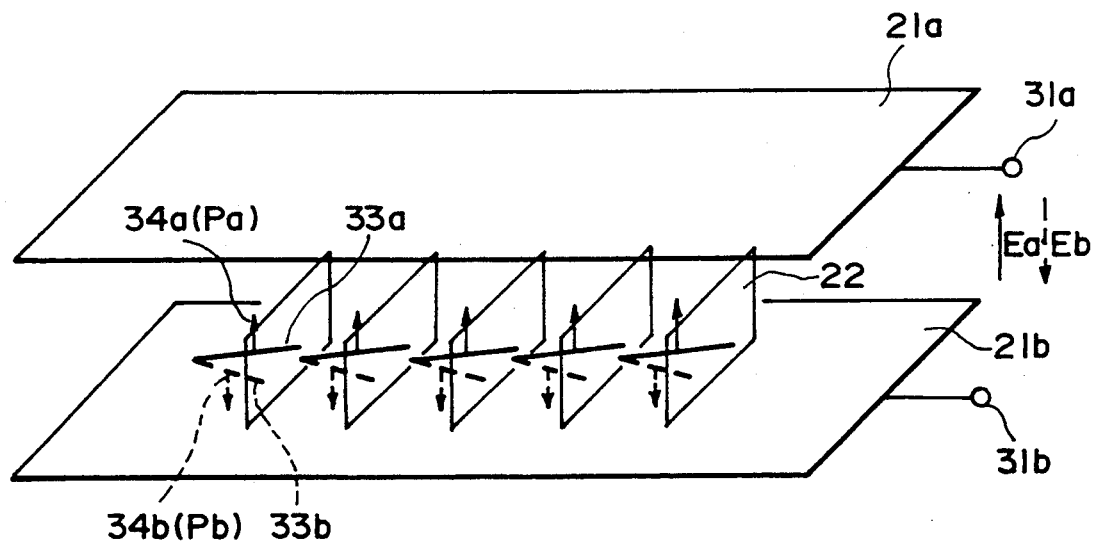
F I G. 3

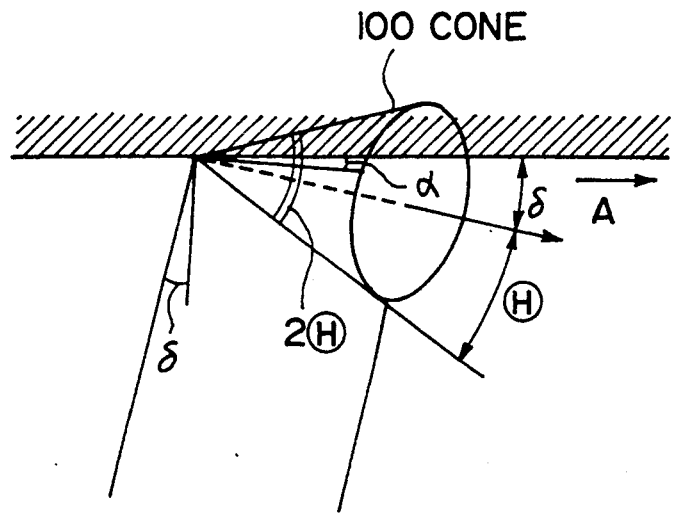
C1 ALIGNMENT  Ⓗ + δ > α
F I G. 10A
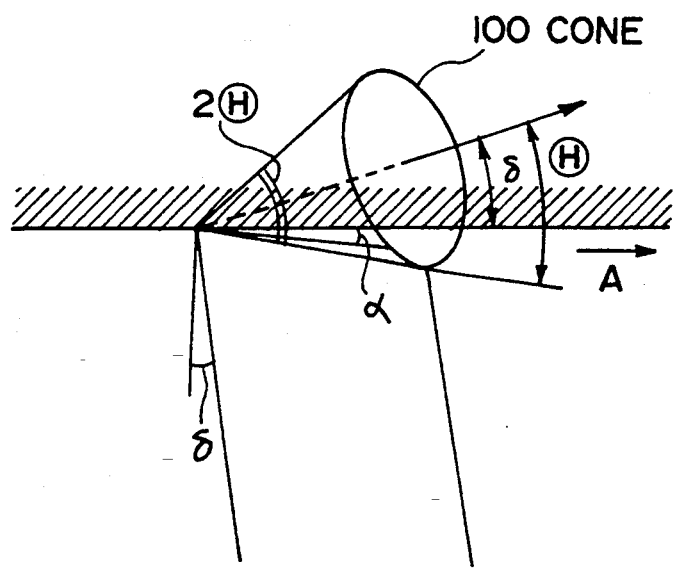
C2 ALIGNMENT  Ⓗ − δ > α
F I G. 10B

LIQUID CRYSTAL DEVICE AND DISPLAY APPARATUS

FIELD OF THE INVENTION AND RELATED ART

This invention relates to a liquid crystal device to be used in a liquid crystal display device or a liquid crystal-optical shutter, etc., particularly a liquid crystal device using of a ferroelectric liquid crystal, more particularly to a liquid crystal device improved in display characteristics through improvement in initial alignment of the liquid crystal molecules, and a display apparatus including the liquid crystal device used as a display panel.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc. Among a response time $\tau$, the magnitude of spontaneous polarization Ps and viscosity $\eta$, the following relationship exists: $\tau = \eta/(Ps \cdot E)$, where E is an applied voltage. Accordingly, a high response speed can be obtained by (a) increasing the spontaneous polarization Ps, (b) lowering the viscosity $\eta$, or (c) increasing the applied voltage E. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose many constraints on the device construction giving bistability. Further, an excessively large spontaneous polarization is liable to accompany an increase in viscosity, so that remarkable increase in response speed may not be attained as a result.

Further, if it is assumed that the operation temperature of an actual display device is 10°–50° C., the response speed changes by a factor of about 10, so that it actually exceeds the range controllable by driving voltage and frequency.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta a \, \sin^2 (\Delta n d/\lambda)\pi,$$

wherein
- $I_0$: incident light intensity,
- $I$: transmitted light intensity,
- $\theta a$: apparent tilt angle,
- $\Delta n$: refractive index anisotropy,
- $d$: thickness of the liquid crystal layer,
- $\lambda$: wavelength of the incident light.

The apparent tilt angle $\theta a$ in the above-mentioned non-helical structure is recognized as a half of an angle between the average molecular axis directions of liquid crystal molecules in a twisted alignment in a first orientation state and a second orientation state. According to the above equation, it is shown that an apparent tilt angle $\theta a$ of 22.5 degrees provides a maximum transmittance and the apparent tilt angle $\theta a$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that an apparent tilt angle $\theta a$ (a half of an angle formed between molecular axes at two stable states) in a ferroelectric liquid crystal with a non-helical structure obtained by alignment with an alignment control film of the prior art has become smaller as compared with a a cone angle $\widehat{H}$ (the angle $\widehat{H}$ is a half of the apex angle of the cone shown in FIG. 10A as described below) in the ferroelectric liquid crystal having a helical structure. Particularly, the apparent tilt angle $\theta a$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the apparent tilt angle in a ferroelectric liquid crystal with a non-helical structure realizing bistability should have the same angle as the tilt angle in the ferroelectric liquid crystal having a helical structure, but in fact the apparent tilt angle $\theta a$ in a non-helical structure is smaller than the cone angle $\widehat{H}$ in a helical structure. More specifically, it has been found that the apparent tilt angle $\theta a$ in a non-helical structure becomes smaller than the cone angle $\widehat{H}$ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the apparent tilt angle $\theta a$ in the non-helical structure is smaller than the cone tilt $\widehat{H}$ in the helical structure.

More specifically, in a ferroelectric liquid crystal having a non-helical structure, the ferroelectric liquid crystal assumes a twisted alignment wherein the liquid crystal molecules are arranged with a continuous twist at a twist angle $\delta$ from a molecule axis adjacent to an upper substrate to a molecule axis adjacent to a lower substrate in a direction of twist alignment with respect to the normal to the substrates.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field (Vrev) due to the presence of the polyimide film as an insulating layer between the electrode and the liquid crystal layer, and the reverse electric field (Vrev) has caused an after-image during display. The generation of the above-mentioned reverse electric field has been reported in "Switching characteristic of SSFLC" by Akio Yoshida, "Preprint for Liquid Crystal Forum, October 1987" p.p. 142–143.

With respect to an alignment state of the ferroelectric liquid crystal, the following phenomenon has been reported by, e.g., Japanese Laid-Open Patent Application (KOKAI) NO. 158415/1989. Two substrates each provided with an insulating alignment control layer comprising a film ("LP-64" (trade name), available from Toray K.K.) providing a relatively low pre-tilt angle by coating are each subjected to rubbing in an direction and superposed with each other with a gap of about 1.5 micron to form a blank cell. Into the cell, a ferroelectric liquid crystal "CS-1014" (trade name, available from Chisso K.K.) is injected, and after sealing, aligned by cooling from a higher temperature phase as shown in FIGS. 5–9. More specifically, FIG. 5 shows a C1 alignment domain or sub-phase including lower contrast states 51 and 52 which is formed immediately after a transition from the higher-temperature phase to a chiral smectic C (SmC*) phase. When the cell is further cooled, a zig-zag defect 53 occurs at a certain temperature and constitutes a boundary changing from the C1 alignment domain to a C2 alignment domain including relatively high contrast orientation states 54 and 55 surrounded by the C1 alignment domain as shown in FIG. 6. The C2 alignment domain gradually extends as the cell is cooled as shown in FIGS. 7 and 8. As a result, the C2 alignment domain occupies an entire area as shown in FIG. 9. Referring to FIG. 4, a C1 alignment domain 42 and a C2 alignment domain 43 respectively have a different chevron structure in a chiral smectic C layer 41.

A smectic liquid crystal generally has a layer structure and, due to a shrinkage of spacing between layers when it causes a transition from SmA to SmC or SmC*, it assumes a chevron structure as shown in FIG. 4 where the layers 41 are bent at a mid point between a pair of substrates.

As shown in FIG. 4, two alignment domains C1 and C2 appear depending on the bending directions. As is well known, as a result of rubbing, liquid crystal molecules contacting a substrate surface form a pretilt angle G, the direction of which is such that the liquid crystal molecules raise a forward end up (i.e., spaced from the substrate surface) in the direction of the rubbing indicated by an arrow A. Because of the pretilt angle $\alpha$, the C1 alignment domain and the C2 alignment domain are not equivalent in elastic energy, thus resulting in a phase transition at a certain temperature as described above. The phase transition is caused by a mechanical distortion in some cases.

Referring to the upper portion of FIG. 4, there is shown a plan view of the layer structure of the smectic liquid crystal. A lightning defect 44 in a zigzag form occurs at a boundary changing from the C1 alignment domain 42 to the C2 alignment domain in the rubbing direction A, and a hairpin defect 45 having a broad and gentle curve occurs at a boundary changing from the C2 alignment domain to the C1 alignment domain in the rubbing direction A. The conventional liquid crystal devices have utilized the above C2 alignment domain for a display in view of a contrast.

When a ferroelectric liquid crystal is injected into a liquid crystal cell to provide a low pretilt angle, the liquid crystal cell is uniformly driven over an entire display area though a response speed is changed depending on the ferroelectric liquid crystal used. On the other hand, when a ferroelectric liquid crystal is injected into a liquid crystal cell to provide a high pretilt angle, the liquid crystal cell causes an irregularity in driving characteristics and a display due to the ferroelectric liquid crystal used though a cell gap between a pair of electrodes is constant, The above irregularity is liable to become noticeable as a size of the liquid crystal cell is enlarged. The reason of occurrence of the irregularity may be attributable to a difference in an injection characteristic of the ferroelectric liquid crystal used due to the cell structure providing the high pretilt angle and a difference in an alignment characteristic due to the injection characteristic.

Thus, as described hereinabove, commercialization of a liquid crystal device requires a ferroelectric liquid crystal having a low viscosity, a high-speed responsiveness and a decreased temperature-dependence of response speed and also requires a device structure which provides a high contrast and a high transmittance and is free from after-image. Further, in order to provide a large picture area display panel, the ferroelectric liquid crystal is required to be readily injected into a liquid crystal cell (or device) to provide a uniform and good alignment state.

SUMMARY OF THE INVENTION

An object of the present invention is to provide a liquid crystal device which shows a high response speed and a decreased temperature-dependence of response speed and has a large display area by using a ferroelectric liquid crystal which is readily injected into a liquid crystal cell to assume a uniform and good alignment state, and an alignment film providing a high pretilt angle in combination.

Another object of the present invention is to provide a liquid crystal device using the ferroelectric liquid crystal in combination with the alignment film so that the liquid crystal device provides a large apparent tilt angle in a chiral smectic liquid crystal with a non-helical structure to show a high contrast and a high transmittance and also to be used as a large-area liquid crystal device showing a good switching characteristic in a wider temperature range including room temperature.

Still another object of the present invention is to provide a display apparatus including the above-mentioned liquid crystal devices.

According to the present invention, there is provided a liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the liquid crystal shows a pretilt angle $\alpha$, a cone angle $\widehat{H}$, an inclination angle $\delta$ of SmC* layer, and an apparent tilt angle $\theta a$ satisfying relationships of: $\widehat{H} < \alpha + \delta$ and $\widehat{H} > \theta a > \widehat{H}2$; and the ferroelectric liquid crystal comprises at least three mesomorphic compounds represented by the following formula (I):

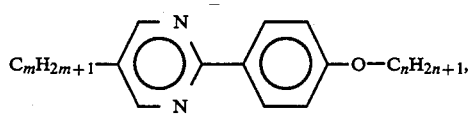
(I)

wherein m and n are an integer of 6 to 12, the above-mentioned at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase,
respectively on temperature decrease from a temperature of isotropic liquid.

The present invention provides a liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the ferroelectric liquid crystal shows a pretilt angle $\alpha$, a cone angle $\widehat{H}$, and an inclination angle $\delta$ of SmC* layer, satisfying a relationship of: $\widehat{H} < \alpha + \delta$, that the alignment state includes at least two states including a first stable state having an optical axis and a second stable state having an optical axis, and that, in case where the liquid crystal device is sandwiched between a pair of right-angle cross nicol polarizers with their standard position that one polarizer is aligned to have its absorption axis dividing an angle between the optical axes of the first and second stable states into equal halves and the other polarizer is aligned to have its absorption axis perpendicular to the absorption axis of the above-mentioned one polarizer, the first stable state provides a first color when the above-mentioned one polarizer alone is rotated clockwise at an appropriate angle of 3–30 degrees from the above-mentioned standard position, which first color is identical to a second color provided by the second stable state when the above-mentioned one polarizer alone is rotated counterclockwise at the appropriate angle from the above-mentioned standard position; and the ferroelectric liquid crystal comprises at least three mesomorphic compounds represented by the following formula (I):

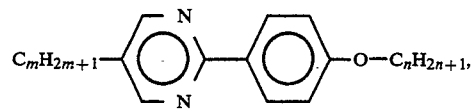
(I)

wherein m and n are an integer of 6 to 12, the above-mentioned at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase,
respectively on temperature decrease from a temperature of isotropic liquid.

The present invention provides a liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the liquid crystal shows a pretilt angle $\alpha$, a cone angle $\widehat{H}$ and an inclination angle $\delta$ of SmC* layer satisfying a relationship of: $\widehat{H} < \alpha + \delta$, and that the alignment state includes totally three or four stable states including two stable states having an extinction position showing a low transmittance and other one or two stable states having an extinction position showing a relatively high transmittance, respectively when combined with cross nicol polarizers; and the ferroelectric liquid crystal comprises at least three mesomorphic compounds represented by the following formula (I):

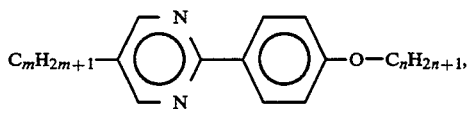
(I)

wherein m and n are an integer of 6 to 12, the above-mentioned at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase,
respectively on temperature decrease from a temperature of isotropic liquid.

The present invention provides a liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state including at least two stable states and having no defects or an inclination of forming a combination of a lightning defect and a hairpin defect generated in this order along the direction of pretilt of liquid crystal molecules raising their forward ends up away from an adjacent one of the substrates or along the rubbing direction, shows a cone angle $\textcircled{H}$ and an apparent tilt angle $\theta a$ satisfying a relationship of: $\textcircled{H} > \theta a > \textcircled{H}/2$, and comprises at least three mesomorphic compounds represented by the following formula (I):

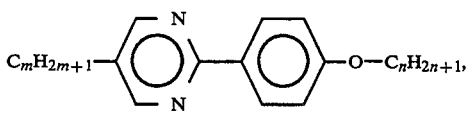

wherein m and n are an integer of 6 to 12, the above-mentioned at least three mesomorphic compounds including:

(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic liquid.

The present invention provides a liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state which includes at least two stable states having an axis and has no defects or an inclination of forming a combination of a lightning defect and a hairpin defect generated in this order along the direction of pretilt of liquid crystal molecules raising their forward ends up away from an adjacent one of the substrates or along the rubbing direction, and comprises at least three mesomorphic compounds represented by the following formula (I):

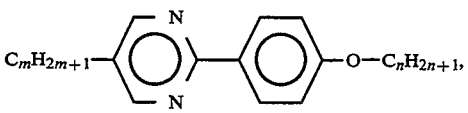

wherein m and n are an integer of 6 to 12, the above-mentioned at least three mesomorphic compounds including:

(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic liquid; and in case where the liquid crystal device is sandwiched between the pair of right-angle cross nicol polarizers with their standard position that one polarizer is aligned to have its absorption axis dividing an angle between the optical axes of the first and second stable states into equal halves and the other polarizer is aligned to have its absorption axis perpendicular to the absorption axis of the above-mentioned one polarizer, the first stable state provides a first color when the above-mentioned one polarizer alone is rotated clockwise at an appropriate angle of 3–30 degrees from the above-mentioned standard position, which first color is identical to a second color provided by the second stable state when the above-mentioned one polarizer alone is rotated counterclockwise at the appropriate angle from the above-mentioned standard position.

The present invention provides a liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state having no defects or an inclination of forming a combination of a lightning defect and a hairpin defect generated in this order along the direction of pretilt of liquid crystal molecules raising their forward ends up away from an adjacent one of the substrates or along the rubbing direction, and comprises at least three mesomorphic compounds represented by the following formula (I):

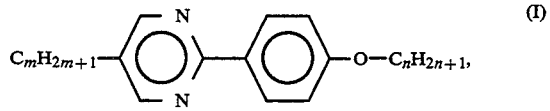

wherein m and n are an integer of 6 to 12, the above-mentioned at least three mesomorphic compounds including:

(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic liquid; and the alignment state includes totally three or four stable states including two stable states having an extinction position showing a low transmittance and other one or two stable states having an extinction position showing a relatively high transmittance, respectively when combined with cross nicol polarizers.

The present invention provides a display apparatus including any one of the above liquid crystal devices and a voltage application means for driving the liquid crystal device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2 and 3 are schematic perspective views of a device cell embodiment for illustrating the operation principle of a liquid crystal device utilizing ferroelectricity of a liquid crystal;

FIGS. 10A and 10B are illustrations of relationship among a cone angle, a pretilt angle and a layer inclination angle in C1 alignment and C2 alignment, respectively;

DETAILED DESCRIPTION OF THE INVENTION

Figure 1:
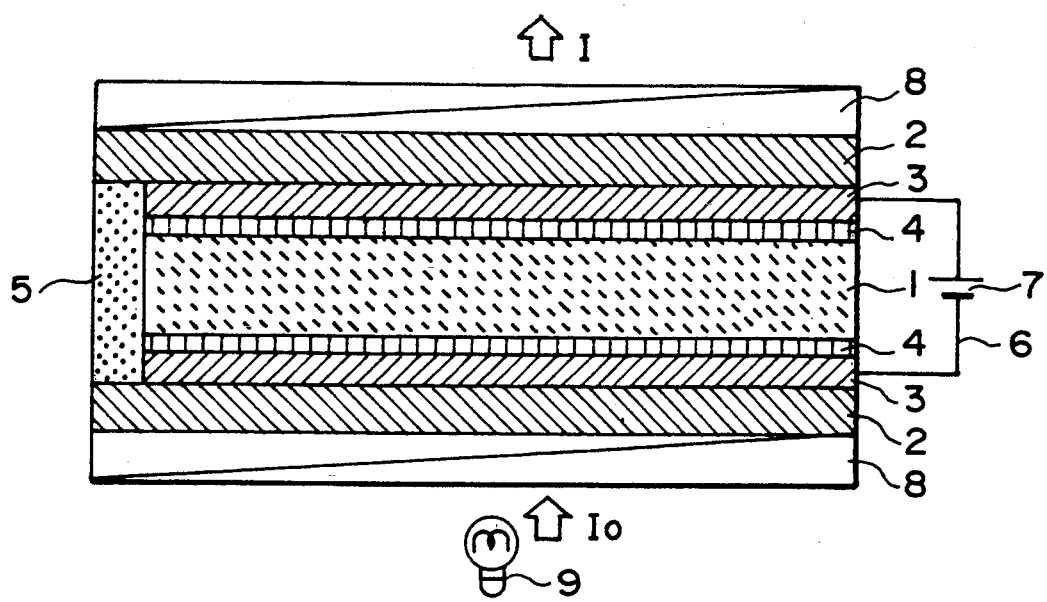
FIG. 1 is a schematic sectional view of a liquid crystal display device using a ferroelectric liquid crystal assuming a chiral smectic phase.

FIG. 1 is a schematic sectional view of an embodiment of the liquid crystal device utilizing ferroelectricity for explanation of the structure thereof.

Referring to FIG. 1, the liquid crystal device includes a liquid crystal layer 1 assuming a chiral smectic phase (i.e., ferroelectric liquid crystal) disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). It is important and necessary to use the insulating alignment control layer which provides a high pretilt angle. The insulating alignment control layer may have a thickness of ordinarily 30 Å–1 micron, preferably 30–3000 Å, further preferably 50–1000 Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a liquid crystal assuming a chiral smectic phase is sealed up to provide a liquid crystal layer 1 in a thickness of generally 0.5 to 20 microns, preferably 1 to 5 microns.

Particularly, in order to show a good alignment characteristic to form a uniform monodomain, the ferroelectric liquid crystal may desirably have a phase transition series comprising isotropic phase—Ch phase (cholesteric phase)—SmA phase (smectic A phase)—SmC* phase (chiral smectic C phase) on temperature decrease when contained in a liquid crystal device.

The transparent electrodes 3 are connected to the external power supply 7 through the lead wires 6. Further, outside the glass substrates 2, polarizers 8 are applied. The device shown in FIG. 1 is of a transmission type and is provided with a light source 9.

FIG. 2 is a schematic illustration of a liquid crystal cell (device) utilizing ferroelectricity for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by using voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

In the above-mentioned device structure, when a specific insulating alignment control film (or layer) and a specific ferroelectric liquid crystal are used in combination, there have been discovered (1) that a transition from a C1 alignment domain to a C2 alignment domain does not readily occur or does not occur at all and (2) that two stable states providing a high contrast (hereinafter, referred to as "uniform state"), other than the conventionally known two stable states providing a low contrast (hereinafter, referred to as "splay states") wherein directors of liquid crystal molecules are successively twisted between a pair of substrates, appear in the C1 alignment domain (Japanese Patent Application No. 49582/1990).

The two stable states or orientation states in the splay alignment and the two stable states or orientation states in the uniform alignment are respectively changed from one to the other. More specifically, a change (transition) between the two states in the splay alignment is caused by application of a relatively weak positive or negative pulse electric field, and change between the two states in the uniform alignment is caused by application of a relatively strong positive or negative pulse electric field.

With respect to the above two types of alignment states, a display device providing a bright and high-contrast image compared with the conventional display devices can be realized by utilizing the uniform alignment state. Such a display device utilizing the uniform alignment state further has the advantage of the transition between two uniform orientation states accompanying no after-image.

Accordingly, a high-quality display system superior to the conventional one is expected by forming a C1 alignment domain over an entire picture area and employing two uniform orientation states in the C1 alignment domain as white and black display states. More specifically, we have confirmed that four orientation states having a chevron structure in C1 alignment states appear in a display area of a liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the ferroelectric liquid crystal shows a pretilt angle $\alpha$, a cone angle $\circled{H}$, and an inclination angle $\delta$ of SmC* layer, satisfying relationships of: $\circled{H} < \alpha + \delta$. The above four orientation states in C1 alignment states are different from those in the conventional or known C1 alignment states. In particular, two orientation states in the four orientation states constitute a bistable state (or two uniform orientation states) providing a high contrast compared with the bistable state in C2 alignment which has conventionally been used, thus providing a large cone angle $\circled{H}$ to effect a high contrast display free from after-image when a liquid crystal device employing such a bistable state (two uniform orientation states) is driven at the uniform orientation state. According to the present invention, there is provided a liquid crystal device further improved in display characteristics by using the above device structure in combination with a particular liquid crystal material for accomplishing the above-mentioned objects.

Hereinbelow, the above-mentioned items (1) and (2) with respect to C1 alignment and C2 alignment will be explained.

The item (1) is explained with reference to FIGS. 10A and 10B. Referring to FIGS. 10A and 10B, directions in the vicinity of the substrates in the C1 alignment and C2 alignment are disposed on cones 100 shown in FIGS. 10A and 10B, respectively. As is well known, as a result of rubbing, liquid crystal molecules contacting a substrate surface form a pretilt angle $\alpha$, the direction of which is such that the liquid crystal molecules raise a forward end up (i.e., spaced from the substrate surface) in the direction of the rubbing indicated by an arrow A. From the above, it is required that the following relationships are satisfied among a cone angle $\circled{H}$, the pretilt angle $\alpha$ and a layer inclination angle $\delta$:

$\circled{H} + \delta > \alpha$ in C1 alignment, and $\circled{H} - \delta > \alpha$ in C2 alignment.

Generally, the layer inclination angle $\delta$ is smaller than the cone angle $\circled{H}$, whereby the latter relationship in C2 alignment is not satisfied when a liquid crystal assuming a low cone angle is used. As a result, C2 alignment does not appear.

Accordingly, the condition for preventing the formation of C2 alignment but allowing C1 alignment is $\circled{H} - \delta < \alpha$, that is $\circled{H} < \alpha + \delta$.

The cone angle $\circled{H}$ and the layer inclination and $\delta$ are changed depending on a temperature of a liquid crystal used, so that C2 alignment appears since the conditions of: $\circled{H} < \alpha + \delta$ cannot be satisfied at a low temperature in some cases even when the condition is satisfied at a certain temperature. Thus, it is required that the condition of: $\circled{H} < \alpha + \delta$ is satisfied over the entire temperature range at which a liquid crystal device is used for constituting a display apparatus.

In the present invention, the pretilt angle $\alpha$ may preferably be in a range of: 6 degrees $< \alpha <$ 30 degrees, more preferably 8 degrees $< \alpha <$ 30 degrees. The cone angle $\circled{H}$ may preferably be in a range of: 7 degrees $< \circled{H} <$ 27 degrees.

Further, the layer inclination angle δ may preferably be in a range: 0 degrees<δ<25 degrees.

Then, the above-mentioned item (2) will be explained.

When a conventional alignment film having a low pretilt angle is used, only two orientation states (or only two stable states) providing a relatively low contrast cannot stably appear in C1 alignment. On the other hand, when an alignment film having a high pretilt angle is used, four orientation states (or four stable states) appear in C1 alignment. More specifically, in the four orientation states, two orientation states (splay alignment state) providing a relatively low contrast are identical to those observed at the use of the conventional low pretilt alignment film (i.e., a state wherein directors of liquid crystal molecules are successively twisted between a pair of substrates), thus failing to find an extinction position and being observed as a pale blue state under a polarizing microscope, and other two orientation states (uniform alignment state) provides a considerably high contrast and a large apparent pretilt angle, thus finding an extinction position under the polarizing microscope observation. The latter orientation states (uniform alignment state) provides a higher contrast and a higher transmittance compared with orientation states in the known C2 alignment. Further, the uniform alignment state in C1 alignment shows a lower transmittance at the extinction position compared with the splay alignment state in C1 alignment under cross nicols. In some cases, two orientation states of the splay alignment cannot be distinct from each other, thus providing three orientation states including two orientation states of the uniform alignment state and one orientation state of the splay alignment state under the polarizing microscope observation.

Under C1 alignment four liquid crystals ① to ④ are subjected to measurement of an apparent tilt angle in the spray alignment state (θa splay) and an apparent tilt angle in the uniform alignment state (θa uniform) under no application of an electrical field, and a cone angle (Ⓗ), respectively. The results are shown in Table A below.

TABLE A

|  | Liquid Crystal | | | |
| --- | --- | --- | --- | --- |
|  | ① | ② | ③ | ④ |
| Cone angle Ⓗ (degrees) | 12 | 17 | 22 | 13 |
| Apparent tilt angle in splay alignment state $\theta a^{splay}$ (degrees) | 5 | 6 | 7 | 5 |
| $\theta a^{splay}/$Ⓗ | 0.42 | 0.35 | 0.32 | 0.38 |
| Apparent tilt angle in uniform alignment state $\theta a^{uniform}$ (degrees) | 10 | 12 | 16 | 7 |
| $\theta a^{uniform}/$Ⓗ | 0.83 | 0.71 | 0.73 | 0.54 |

As apparent from the above Table A, each of the liquid crystals ① to ④ shows a smaller $\theta a^{splay}$ and a larger $\theta a^{uniform}$. In all the liquid crystals ① to ④, ratios of $\theta a^{splay}/$Ⓗ satisfy the condition of: $\theta a^{splay}/$Ⓗ<0.4 and ratios of $\theta a^{uniform}$ Ⓗ satisfy the condition of: $\theta a^{uniform}/$Ⓗ>0.5, that is, $\theta a^{uniform}>$Ⓗ/2. Herein, a state satisfying a relationship of: Ⓗ>θa>Ⓗ/2 is referred to as "uniform alignment state".

In the present invention, a uniform alignment state in C1 alignment may be used for effecting a display by employing a liquid crystal device comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the ferroelectric liquid crystal shows a pretilt angle α, a cone angle Ⓗ, an inclination angle δ of SmC* layer, and an apparent tilt angle θa satisfying relationships of: Ⓗ<α+δ and Ⓗ>θa>Ⓗ2.

Figure 4:
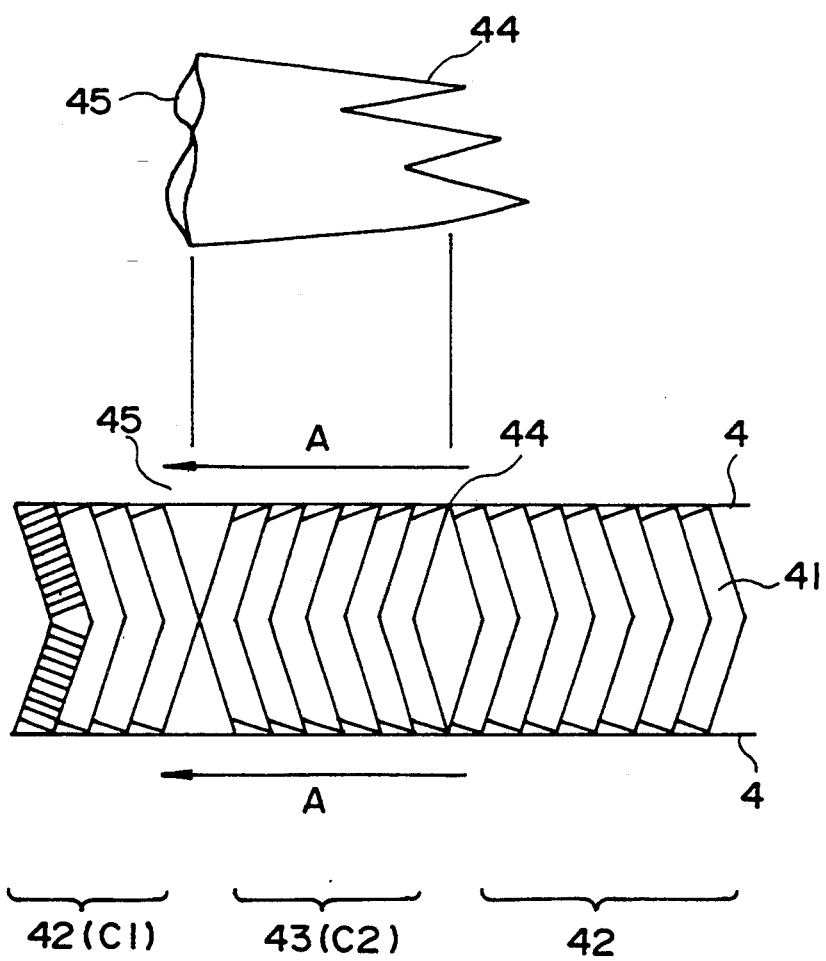
FIG. 4 is a schematic sectional view showing states of C1 alignment and C2 alignment.
Figure 5:
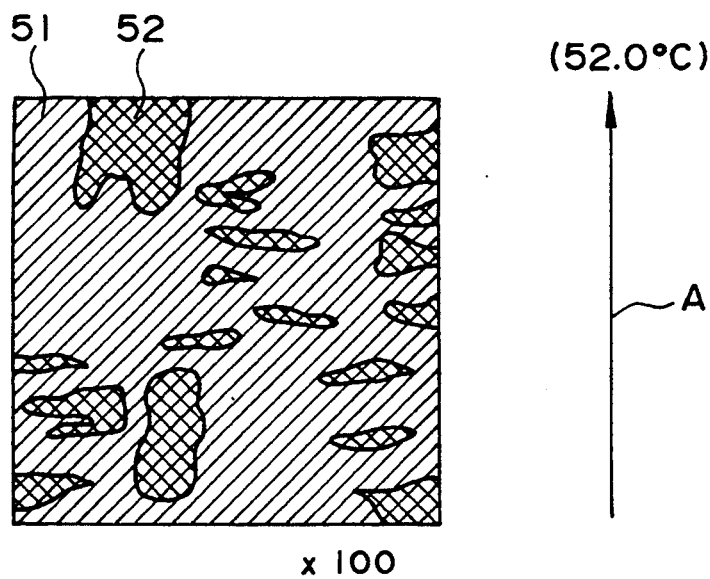
FIGS. 5–9 are schematic views showing alignment states of a ferroelectric liquid crystal varying depending on temperature.
Figure 6:
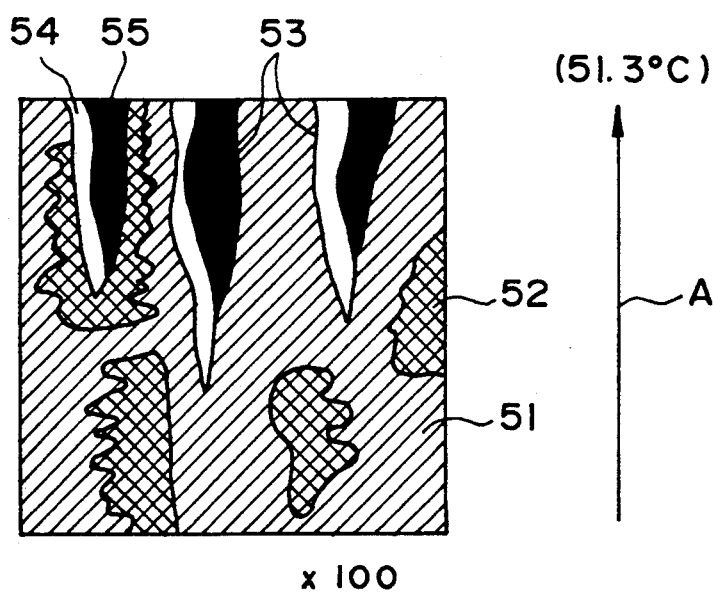
Figure 7:
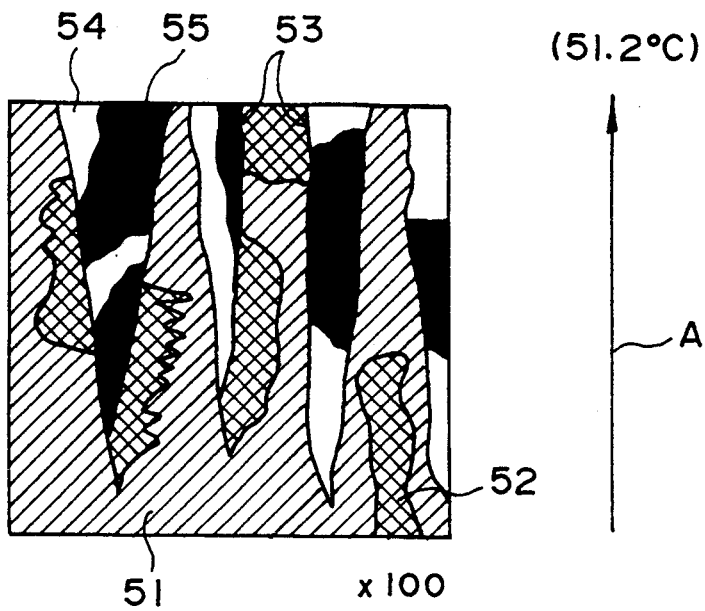
Figure 8:
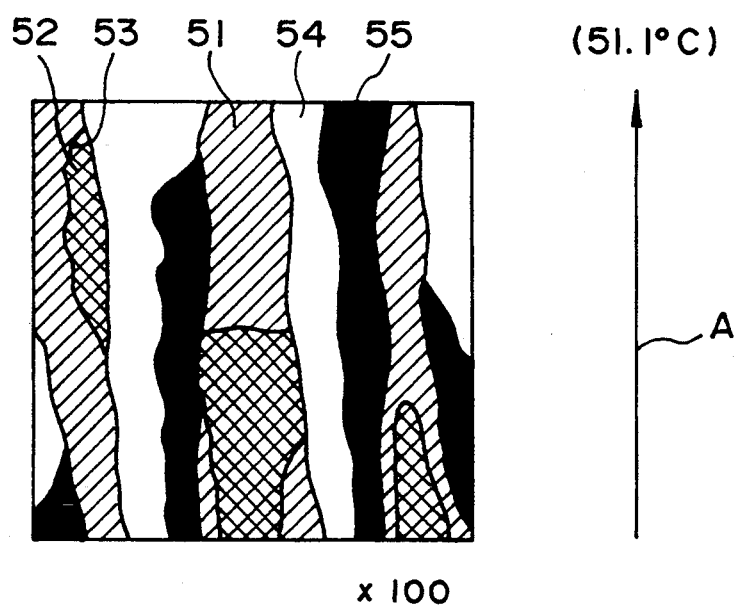
Figure 9:
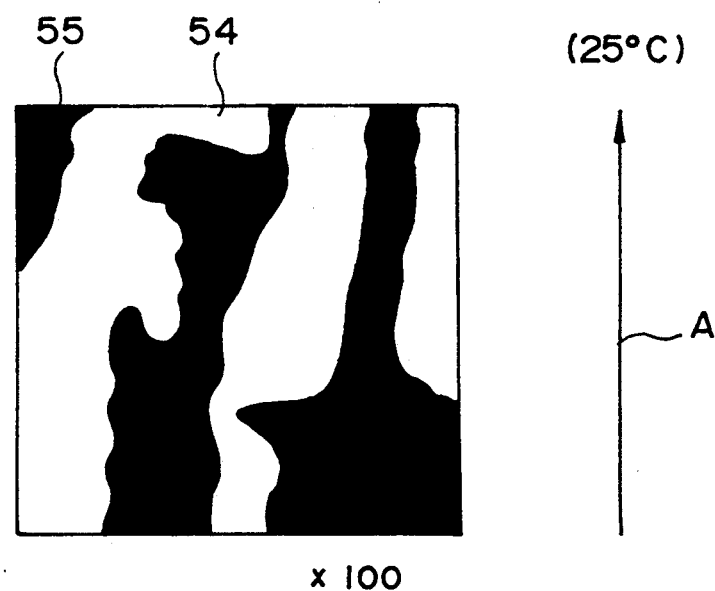

Herein, the C1 alignment (domain) has an inclination of forming a combination of a hairpin defect and a lightning defect generated due to the presence of a spacer, such as alumina beads or silica beads, between a pair of substrates or due to distortion of the substrates. In such a C1 alignment, the hair-pin defect comes after the minute lightning defect along the direction of pretilt (i.e., the direction of which is such that liquid crystal molecules raise a forward end up or are spaced from the substrate surface) or along the direction of the rubbing as indicated by an arrow A in FIGS. 4, 10A and 10B. In another respect, it is possible to say that a state in the C1 alignment is a state free from a change in an alignment state accompanying the above hairpin defect and lightning defect during a phase transition from a higher temperature phase, such as SmA to SmC* on temperature decrease.

A difference between the splay alignment state and the uniform alignment state in the C1 alignment also appears in a contrast ratio in addition to the above-mentioned apparent tilt angle $\theta a^{splay}$ and $\theta a^{uniform}$. As described hereinabove, in the splay alignment state, a clear extinction position cannot be found under cross nicols even in a dark state, thus failing to provide a high contrast ratio. When a polarizer is disposed in a position turned or rotated from the position providing the cross nicols by several degrees, a darker state can be obtained compared with the above state under the cross nicols. On the other hand, in the uniform alignment state, an almost clear extinction position can be found under cross nicols to provide a high contrast ratio. This may be clarified by the following observation.

A pair of polarizers are disposed so that an absorption axis of one polarizer is aligned with the direction dividing an angle formed by two optical axes given by two stable states (upper or first) and lower (or second) stable states) into two equal parts (i.e., the direction of a normal line of a smectic layer) and an absorption axis of the other polarizer is aligned with the direction perpendicular to the absorption axis of the above-mentioned one polarizer, thus providing (right-angle) cross nicols.

When only an analyzer (i.e., the polarizer closer to an observer) is rotated clockwise at an appropriate angle between 3 degrees and 30 degrees from the above-mentioned position (under cross nicols), a difference in transmittance between the upper and lower stable states arises, thus making a contrast. At this time, a upper stable state gives a dark or deep color and a lower stable state gives a light or pale color in many cases. On the other hand, when the analyzer is rotated counterclockwise at an angle identical to the above-mentioned angle from the position (under cross nicols), the upper stable state gives a light color and the lower stable state gives a dark color.

Accordingly, based on the above observation, it is possible to distinguish the splay alignment state and the uniform alignment state from each other in respect of quality. More specifically, in a case where a liquid crystal cell (or device) has a cell gap of 1.0 to 2 microns, the above-mentioned upper and lower stable states in the splay alignment state give brown or purple (in the clockwise direction) and blue or deep blue (in the counterclockwise direction), respectively, thus providing different two colors. On the other hand, both of upper and lower stable states in the uniform alignment state give brown or purple under the above conditions, thus providing the same color. This may be attributable to the above-mentioned fact that directions of liquid crystal molecules in the splay alignment state are successively twisted between a pair of substrates.

In the present invention, a preferred embodiment of the liquid crystal device may include a liquid crystal device including a ferroelectric liquid crystal showing three or four stable states free from defects including the above-mentioned combination of the minute hairpin defect and the minute lightning defect.

Easiness of appearance of the above-mentioned uniform alignment state is changed by a ferroelectric liquid crystal used. In the present invention, the ferroelectric liquid crystal is constituted by at least three mesomorphic compounds represented by the following formula (I):

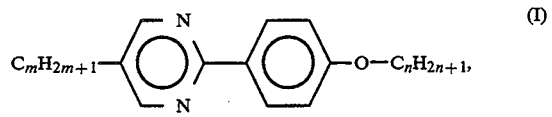

wherein m and n are an integer of 6 to 12, said at least three mesomorphic compounds including:

(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic liquid.

The above three species ((a), (b) and (c)) of mesomorphic compounds represented by the formula (I) may be synthesized through a process disclosed in East Germany Patent No. 95892/1973 or Japanese Patent Publication (JP-B) No. 5434/1987.

Specific examples of the mesomorphic compounds represented by the above-mentioned general formula (I) may include those shown by structural formulas appearing hereinbelow.

Further, phase transition temperatures (°C.) of the mesomorphic compounds of the formula (I) are also indicated below. The phase transition temperatures include: those on temperature decrease from a temperature of isotropic liquid; and those on temperature increase from a temperature of crystal state, etc. to a temperature of smectic phase, nematic phase, etc.

Herein, the respective symbols denote the following phase; Iso: isotropic phase; N: nematic phase; SmA: smectic A phase; SmC: smectic C phase; and Cry: crystal phase.

| Ex. Comp. No. | Structural formula | Phase transition temperature (°C.) |
|---|---|---|
| (1) | $C_6H_{13}$–pyrimidine–phenyl–$O-C_6H_{13}$ | Cry $\xrightarrow{38.2}$ N $\xleftarrow{62.3}$ Iso |
| (2) | $C_7H_{15}$–pyrimidine–phenyl–$O-C_6H_{13}$ | |
| (3) | $C_8H_{17}$–pyrimidine–phenyl–$O-C_6H_{13}$ | Cry $\xrightarrow{30.3}$ SmC $\xleftarrow{48.0}$ SmA $\xleftarrow{58.3}$ N $\xleftarrow{66.0}$ Iso |
| (4) | $C_9H_{19}$–pyrimidine–phenyl–$O-C_6H_{13}$ | Cry $\xrightarrow{29.2}$ SmC $\overline{44.3}$ SmA $\overline{71.0}$ N $\overline{71.5}$ Iso |
| (5) | $C_{10}H_{21}$–pyrimidine–phenyl–$O-C_6H_{13}$ | Cry $\xrightarrow{39.9}$ SmC $\xleftarrow{59.0}$ SmA $\xleftarrow{71.9}$ Iso |
| (6) | $C_{11}H_{23}$–pyrimidine–phenyl–$O-C_6H_{13}$ | |

-continued

| Ex. Comp. No. | Structural formula | Phase transition temperature (°C.) |
|---|---|---|
| (7) | 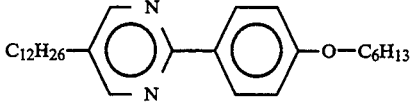 | Cry $\xrightarrow{44.4}$ SmC $\xleftarrow{65.0}$ SmA $\xleftarrow{75.9}$ Iso |
| (8) | 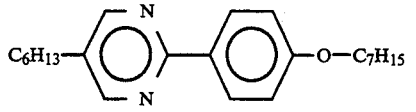 | Cry $\xrightarrow{40.2}$ N $\xleftarrow{60.2}$ Iso |
| (9) | 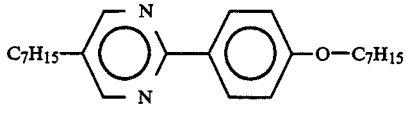 | Cry $\xrightarrow{42.3}$ SmA $\xleftarrow{48.9}$ N $\xleftarrow{68.3}$ Iso |
| (10) | 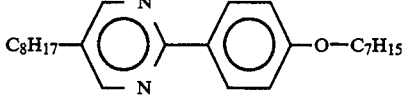 | Cry $\xrightarrow{42.8}$ SmC $\xleftarrow{49.1}$ SmA $\xleftarrow{60.3}$ N $\xleftarrow{66.1}$ Iso |
| (11) | 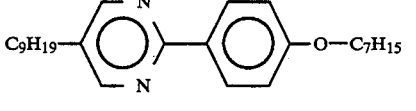 | Cry $\xrightarrow{38.2}$ SmC $\xleftarrow{49.6}$ SmA $\xleftarrow{73.9}$ Iso |
| (12) | 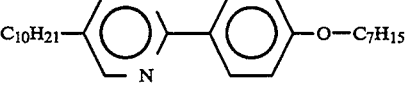 | Cry $\xrightarrow{50.6}$ SmC $\xleftarrow{64.5}$ SmA $\xleftarrow{71.7}$ Iso |
| (13) | 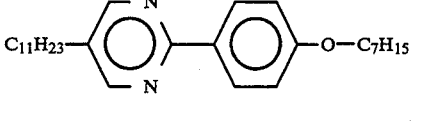 | Cry $\xrightarrow{45.0}$ SmC $\xleftarrow{69.5}$ SmA $\xleftarrow{77.9}$ Iso |
| (14) | 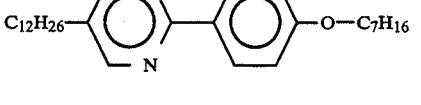 | |
| (15) | 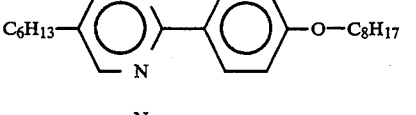 | Cry $\xrightarrow{42.5}$ N $\xleftarrow{63.8}$ Iso |
| (16) | 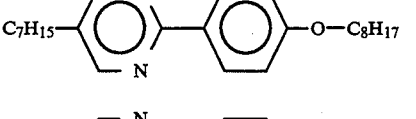 | |
| (17) | 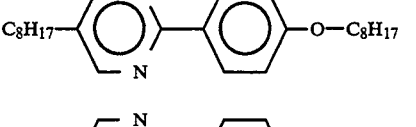 | Cry $\xrightarrow{25.6}$ SmC $\xleftarrow{58.1}$ SmA $\xleftarrow{65.2}$ N $\xleftarrow{71.2}$ Iso |
| (18) | 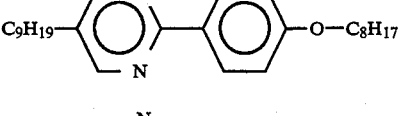 | Cry $\xrightarrow{33.4}$ SmC $\xleftarrow{58.8}$ SmA $\xleftarrow{71.6}$ Iso |
| (19) | 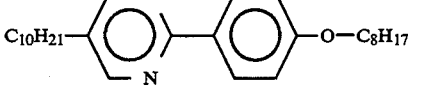 | Cry $\xrightarrow{42.6}$ SmC $\xleftarrow{70.4}$ SmA $\xleftarrow{75.1}$ Iso |

| Ex. Comp. No. | Structural formula | Phase transition temperature (°C.) |
|---|---|---|
| (20) | 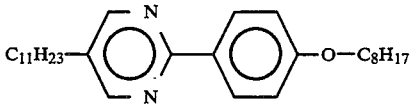 C$_{11}$H$_{23}$—[pyrazine]—[phenyl]—O—C$_8$H$_{17}$ | |
| (21) | 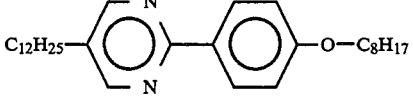 C$_{12}$H$_{25}$—[pyrazine]—[phenyl]—O—C$_8$H$_{17}$ | |
| (22) | 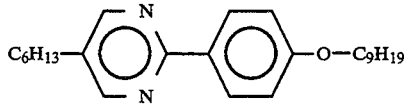 C$_6$H$_{13}$—[pyrazine]—[phenyl]—O—C$_9$H$_{19}$ | Cry $\xrightarrow{39.6}$ N $\xleftrightarrow{63.2}$ Iso |
| (23) | 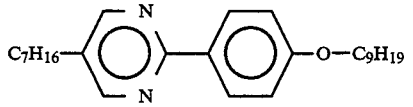 C$_7$H$_{16}$—[pyrazine]—[phenyl]—O—C$_9$H$_{19}$ | Cry $\xrightarrow{48.3}$ SmC $\xleftrightarrow{53.2}$ SmA $\xleftrightarrow{58.2}$ N $\xleftrightarrow{72.2}$ Iso |
| (24) | 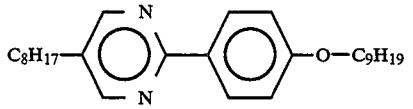 C$_8$H$_{17}$—[pyrazine]—[phenyl]—O—C$_9$H$_{19}$ | Cry $\xrightarrow{38.3}$ SmC $\xleftrightarrow{58.1}$ SmA $\xleftrightarrow{65.5}$ N $\xleftrightarrow{68.5}$ Iso |
| (25) | 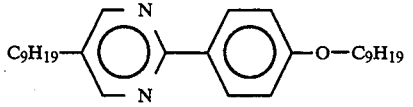 C$_9$H$_{19}$—[pyrazine]—[phenyl]—O—C$_9$H$_{19}$ | Cry $\xrightarrow{37.2}$ SmC $\xleftrightarrow{62.6}$ SmA $\xleftrightarrow{74.4}$ Iso |
| (26) | 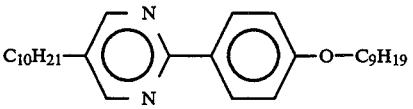 C$_{10}$H$_{21}$—[pyrazine]—[phenyl]—O—C$_9$H$_{19}$ | |
| (27) | 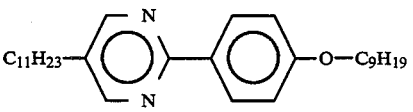 C$_{11}$H$_{23}$—[pyrazine]—[phenyl]—O—C$_9$H$_{19}$ | |
| (28) | 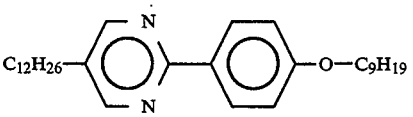 C$_{12}$H$_{26}$—[pyrazine]—[phenyl]—O—C$_9$H$_{19}$ | |
| (29) | 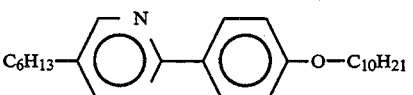 C$_6$H$_{13}$—[pyrazine]—[phenyl]—O—C$_{10}$H$_{21}$ | Cry $\xrightarrow{43.1}$ N $\xleftrightarrow{64.5}$ Iso |
| (30) | 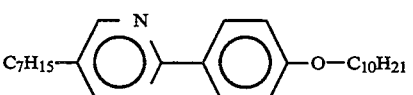 C$_7$H$_{15}$—[pyrazine]—[phenyl]—O—C$_{10}$H$_{21}$ | |
| (31) | 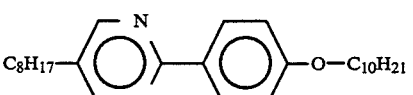 C$_8$H$_{17}$—[pyrazine]—[phenyl]—O—C$_{10}$H$_{21}$ | Cry $\xrightarrow{36.8}$ SmC $\overline{61.8}$ SmA $\overline{67.1}$ N $\overline{70.2}$ Iso |

-continued

| Ex. Comp. No. | Structural formula | Phase transition temperature (°C.) |
|---|---|---|
| (32) | $C_9H_{21}-\text{pyrazine}-\text{phenyl}-O-C_{10}H_{21}$ | |
| (33) | $C_{10}H_{21}-\text{pyrazine}-\text{phenyl}-O-C_{10}H_{21}$ | Cry $\xrightarrow{43.2}$ SmC $\underset{75.1}{\longleftrightarrow}$ SmA $\underset{79.2}{\longleftrightarrow}$ Iso |
| (34) | $C_{11}H_{23}-\text{pyrazine}-\text{phenyl}-O-C_{10}H_{21}$ | |
| (35) | $C_{10}H_{26}-\text{pyrazine}-\text{phenyl}-O-C_{10}H_{21}$ | |
| (36) | $C_6H_{13}-\text{pyrazine}-\text{phenyl}-O-C_{11}H_{23}$ | Cry $\xrightarrow{48.2}$ N $\underset{63.1}{\longleftrightarrow}$ Iso |
| (37) | $C_7H_{15}-\text{pyrazine}-\text{phenyl}-O-C_{11}H_{23}$ | |
| (38) | $C_8H_{17}-\text{pyrazine}-\text{phenyl}-O-C_{11}H_{23}$ | Cry $\xrightarrow{48.9}$ SmC $\underset{62.3}{\longleftrightarrow}$ SmA $\underset{69.1}{\longleftrightarrow}$ N $\underset{71.2}{\longleftrightarrow}$ Iso |
| (39) | $C_9H_{19}-\text{pyrazine}-\text{phenyl}-O-C_{11}H_{23}$ | |
| (40) | $C_{10}H_{21}-\text{pyrazine}-\text{phenyl}-O-C_{11}H_{23}$ | |
| (41) | $C_{11}H_{23}-\text{pyrazine}-\text{phenyl}-O-C_{11}H_{23}$ | |
| (42) | $C_{12}H_{26}-\text{pyrazine}-\text{phenyl}-O-C_{11}H_{23}$ | |
| (43) | $C_6H_{13}-\text{pyrazine}-\text{phenyl}-O-C_{12}H_{25}$ | Cry $\xrightarrow{52.7}$ N $\underset{64.2}{\overset{65.5}{\longleftrightarrow}}$ Iso |
| (44) | $C_7H_{15}-\text{pyrazine}-\text{phenyl}-O-C_{12}H_{25}$ | |

-continued

| Ex. Comp. No. | Structural formula | Phase transition temperature (°C.) |
|---|---|---|
| (45) | C$_8$H$_{17}$—[pyridazine]—[phenyl]—O—C$_{12}$H$_{25}$ | Cry $\xrightarrow{46.2}$ SmC $\xleftarrow{63.1}$ SmA $\xleftarrow{70.2}$ N $\xleftarrow{71.8}$ Iso |
| (46) | C$_9$H$_{19}$—[pyridazine]—[phenyl]—O—C$_{12}$H$_{25}$ | |
| (47) | C$_{10}$H$_{21}$—[pyridazine]—[phenyl]—O—C$_{12}$H$_{25}$ | |
| (48) | C$_{11}$H$_{23}$—[pyridazine]—[phenyl]—O—C$_{12}$H$_{26}$ | |
| (49) | C$_{12}$H$_{26}$—[pyridazine]—[phenyl]—O—C$_{12}$H$_{26}$ | |

The mesomorphic compounds constituting the ferroelectric liquid crystal used in the present invention are classified into three types of compounds (Classes (a), (b) and (c)) below by their phase transition characteristics.

Class (a) compound (Example Compound Nos. (8), (9), (15), (22), (29), (36), (43), etc.)

A mesomorphic compound of this class shows a nematic phase and does not show a smectic C phase, or shows a nematic phase and a smectic A phase and does not show a smectic C phase when the mesomorphic compound is cooled from an isotropic liquid state thereof (i.e., on temperature decrease from a temperature of an isotropic phase).

Class (b) compound (Ex. Comp. Nos. (3), (4), (10), (17), (23), (24), (31), (38), (45), etc.)

A mesomorphic compound of this class shows a nematic phase, a smectic A phase, and a smectic C phase on a temperature decrease from a temperature of an isotropic liquid.

Class (c) compound (Ex. Comp. Nos. (5), (7), (11), (12), (13), (18), (19), (25), (33), etc.)

A mesomorphic compound of this class does not show a nematic phase and shows a smectic A phase and a smectic C phase on a temperature decrease from a temperature of an isotropic liquid.

Herein, a phase transition temperature (°C.) of the mesomorphic compound used in the present invention is measured by a differential scanning calorimeter (DSC) (DSC-7 series, manufactured by Parkinelmer Co.). Further, identification of each phase is performed as follows. A liquid crystal composition is prepared by mixing a sample compound of the formula (I) with 1–5 wt. % of an optically active compound to the sample compound and is injected into a blank cell prepared by applying an alignment film on a pair of glass plates each provided with a transparent electrode and subjected the resultant glass plate to rubbing. The thus-prepared liquid crystal cell is subjected to observation by a polarizing microscope under voltage application and temperature control in a hot stage (Thermosystem FP-80/FP-82, manufactured by Metter Instrument AG), thus identifying each phase. Further, when the liquid crystal composition is cooled from an isotropic liquid state thereof, each phase (a nematic phase, a smectic A phase or a smectic C phase) is defined as the one in a case where each phase has at least 0.5° C. of a temperature range showing the phase.

The ferroelectric liquid crystals or liquid crystal compositions containing above-mentioned mesomorphic compounds (classes (a), (b) and (c) compounds) have the following features, respectively.

Class (a) compound

A liquid crystal composition containing the class (a) compound has an enlarged nematic temperature range and a decreased melting point (m.p.) but has a lowered $T_{AC}$ (i.e., SmA→SmC phase transition temperature (°C.)).

Class (b) compound

A liquid crystal composition containing the class (b) compound has a decreased m.p., an improved mutual solubility, a low viscosity but has a lowered $T_{AC}$.

Class (c) compound

A liquid crystal composition containing the class (c) compound has a heightened $T_{AC}$ but has a reduced temperature range showing a nematic phase.

The above-mentioned features imparted by each class of compounds have an effect on various characteristics of a liquid crystal device, such as a response speed, an operation temperature range, temperature characteristics, an alignment characteristic or an injection characteristic and thus it is important to employ the above three classes (Classes (a), (b) and (c)) of compounds in combination further in view of commercialization of a large area-display device having a high contrast and a high transmittance.

The ferroelectric liquid crystal used in the present invention may be obtained by mixing a liquid crystal composition comprising at least one class (a) compound, at least one class (b) compound and at least one class (c) compound represented by the formula (I) with another mesomorphic compound or composition in appropriate proportions. The ferroelectric liquid crystal may preferably show a chiral smectic phase.

In formulating the ferroelectric liquid crystal, species and contents of the above compounds of the classes (a), (b) and (c) may be selected in view of those of another mesomorphic compound. For instance, when another mesomorphic compound has a broad cholesteric temperature range and a lowered $T_{AC}$, it may be advantageous to a ferroelectric liquid crystal containing a large amount of the class (b) compound or the class (c) compound compared with the class (a) compound having a nematic phase in view of a phase transition temperature. Further, when the content of each class of compound exceeds 10 wt. % to the ferroelectric liquid crystal, the use of two or more species of each class of compound may be effective for providing a good mutual solubility and fine-controlled characteristics.

It is an important factor to use a liquid crystal composition containing at least one class (a) compound, at least one class (b) compound and at least one class (c) compound for improving various characteristics. It is desirable that the liquid crystal composition containing the above three classes of compounds is formulated in view of the contents of the three classes of compounds effecting on the resultant ferroelectric liquid crystal and being free from disadvantages, such as an increased m.p. and a decreased $T_{AC}$, through experiments thereon.

In the present invention, a mixing weight ratio of (class (a) compound): (class (b) compound): (class (c) compound) may preferably be 5:85:10 to 30:30:40, particularly 10:75:15 to 30:40:30. Further, a total content (by weight) of the class (a) compound, the class (b) compound and the class (c) compound contained in the ferroelectric liquid crystal may preferably be 5-60 wt. %, particularly 10-40 wt. %.

The above-mentioned another mesomorphic compound may include those represented by the following formulas (II)-(IX).

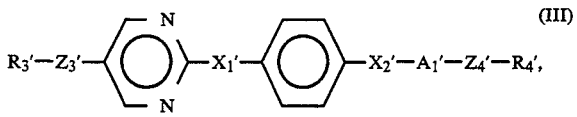

(II)

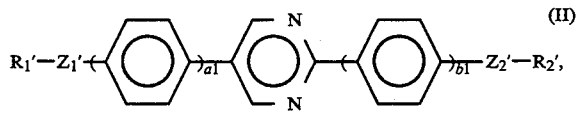

wherein $R_1'$ and $R_2'$ respectively denote a linear or branched alkyl group having 1-18 carbon atoms capable of including one or non-neighboring two or more methylene (—CH$_2$—) groups which can be replaced with

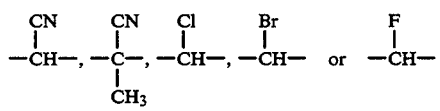

and further capable of including at least one methylene group other than the one directly connected to $Z_1'$ or $Z_2'$ which can be replaced with —O—, —CO—, —OCO— or —COO; $Z_1'$ and $Z_2'$ respectively denote a single bond, —O—, —COO—, —OCO— or —OCOO—; and a1 and a2 respectively denote 0, 1 or 2 with the proviso that a1+b1=1 or 2 and at least one of $R_1'$ and $R_2'$ is an optically active group when a1+b1=1.

(III)

wherein $R_3'$ and $R_4'$ respectively denote a linear or branched alkyl group having 1-18 carbon atoms capable of including one or non-neighboring two or more methylene (—CH$_2$—) groups which can be replaced with $$-\overset{CN}{\underset{|}{CH}}-, -\overset{CN}{\underset{|}{\underset{CH_3}{C}}}-, -\overset{Cl}{\underset{|}{CH}}- \text{ or } -\overset{Br}{\underset{|}{CH}}-$$

and further capable of including at least one methylene group other than the one directly connected to $Z_3'$ or $Z_4'$ which can be replaced with —O—, —CO—, —OCO— or —COO, $Z_3'$ and $Z_4'$ respectively denote a single bond, —O—, —COO—, —OCO— or —OCOO; $X_1'$ and $X_2'$ respectively denote a single bond, —COO—, —OCO—, —CH$_2$O— or —OCH$_2$— with the proviso that $X_1'$ and $X_2'$ cannot be a single bond simultaneously; and $A_1'$ denotes

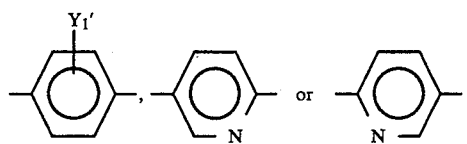

wherein $Y_1'$ is hydrogen, halogen, —CH$_3$ or —CF$_3$.

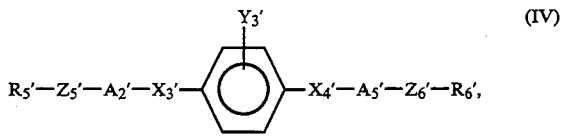

(IV)

wherein $R_5'$ and $R_6'$ respectively denote a linear or branched alkyl group having 1-18 carbon atoms capable of including one or non-neighboring two or more methylene (—CH$_2$—) groups which can be replaced with

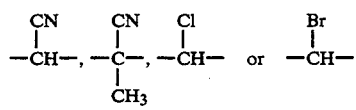

and further capable of including at least one methylene group other than the one directly connected to $Z_5'$ or $Z_6'$ which can be replaced with —O—, —CO—, —OCO— or —COO; $A_2'$ denotes

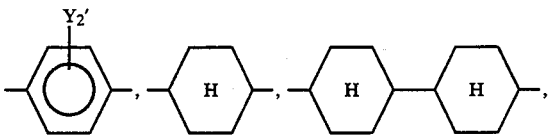

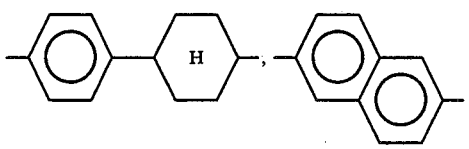

or a single bond; A$_3$′ denotes

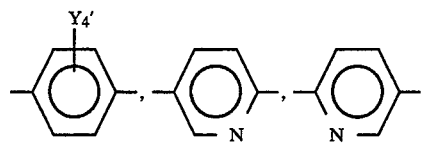

or a single bond; Z$_5$′ and Z$_6$′ respectively denote a single bond, —O—, —COO—, —OCO— or —OCOO—; X$_3$′ and X$_4$′ respectively denote a single bond, —COO—, —OCO—, —CH$_2$O— or —OCH$_2$—; and Y$_2$′, Y$_3$′ and Y$_4$′ respectively denote hydrogen, halogen, —CH$_3$ or —CF$_3$, with the proviso that: A$_2$′ and A$_3$′ cannot be a single bond simultaneously; X$_3$′ is a single bond when A$_2$′ is a single bond; and X$_4$′ is a single bond when A$_3$′ is a single bond.

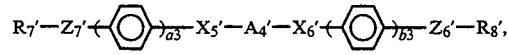
(V)

wherein R$_7$′ and R$_8$′ respectively denote a linear or branched alkyl group having 1-18 carbon atoms capable of including one or non-neighboring two or more methylene (—CH$_2$—) groups which can be replaced with

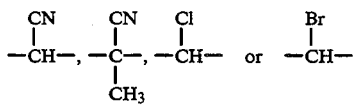

and further capable of including at least one methylene group other than the one directly connected to Z$_7$′ or Z$_8$′ which can be replaced with —O—, —CO—, —OCO— or —COO; A$_4$′ denotes

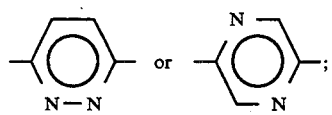

Z$_7$′ and Z$_8$′ respectively denote a single bond, —O—, —COO—, —OCO— or —OCOO; X$_5$′ and X$_6$′ respectively denote a single bond, —COO—, —OCO—, —CH$_2$O— or —OCH$_2$—; and a3 and b3 respectively denote 0 or 1 with the proviso that a3 and b3 cannot be 0 simultaneously.

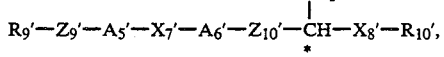

wherein R$_9$′ denotes a linear or branched alkyl group having 1-18 carbon atoms; R$_{10}$′ denotes a linear or branched alkyl group having 1-16 carbon atoms; A$_5$′ denotes

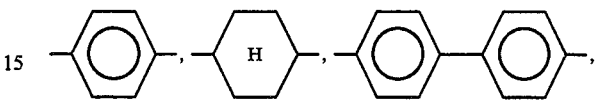

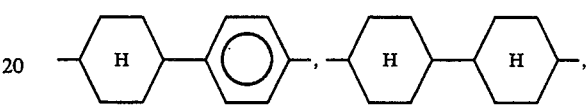

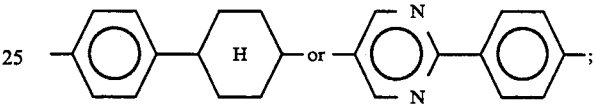

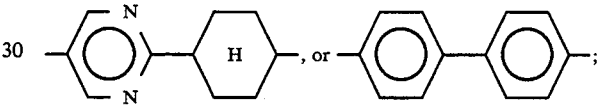

A$_6$′ denotes

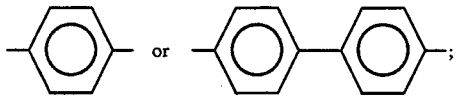

X$_7$′ denotes a single bond,

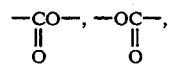

—CH$_2$O— or —OCH$_2$—; X$_8$′ denotes a single bond or

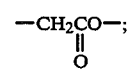

Z$_9$′ denotes a single bond, —O—,

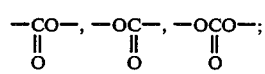

Z$_{10}$′ denotes a single bond,

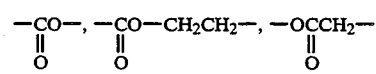

or —O—CH$_2$CH$_2$—; and C* denotes an asymmetric carbon atom.

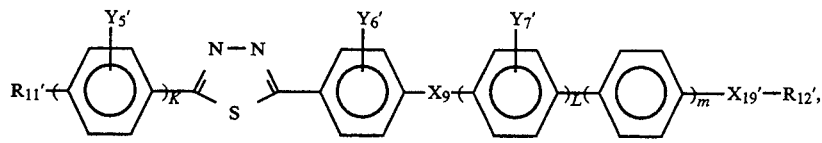
(VII)

wherein K, L and M are 0 or 1 with the proviso that K+L+M=0 or 1; $Y_5'$, $Y_6'$ and $Y_7'$ respectively denote H or F; $X_9'$ denotes a single bond,

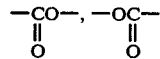

or —O—; $X_{10}'$ denotes a single bond,

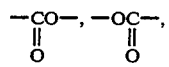

—CH$_2$O— or —OCH$_2$—; and $R_{11}'$ and $R_{12}'$ respectively denote a linear or branched alkyl group having 1-18 carbon atoms capable of including one or two or more non-neighboring methylene groups other than those directly connected to $X_9'$ or $X_{10}'$ which can be replaced with at least one species of —O—,

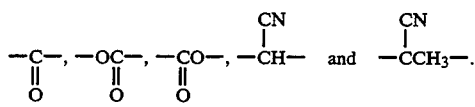

Further, preferred examples of $R_{11}'$ and $R_{12}'$ may respectively include those represented by the following groups i) to vi):

i) a linear alkyl group having 1-15 carbon atoms;

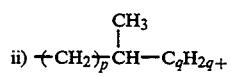

wherein p denotes an integer of 0-5 and q denotes an integer of 2-11 (optically active or inactive);

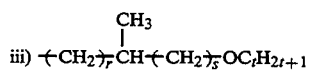

wherein r denotes an integer of 0-6, s denotes 0 or 1, and t denotes an integer of 1-14 (optically active or inactive);

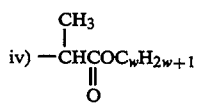

wherein w denotes an integer of 1-15 (optically active or inactive);

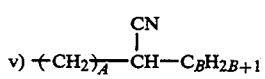

wherein A denotes an integer of 0-2 and B denotes an integer of 1-15 (optically active or inactive); and

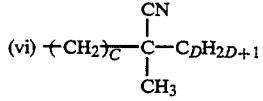

wherein C denotes an integer of 0-2 and D denotes an integer of 1-15 (optically active or inactive).

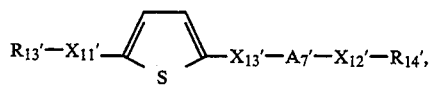
(VIII)

wherein $A_7'$ denotes —$A_9'$— or —$A_8'$—$A_9'$— wherein $A_8'$ and $A_9'$ respectively denote

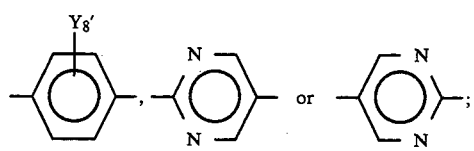

$Y_8'$ denotes H or F; $X_{11}'$ and $X_{12}'$ respectively denote —O—,

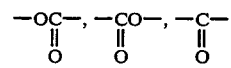

or a single bond; and $X_{13}'$ denotes

or —CH$_2$O—; and $R_{13}'$ and $R_{14}'$ respectively denote a linear or branched alkyl group having 1-18 carbon atoms capable of including one or two or more non-neighboring methylene groups which can be replaced with —CH halogen— and capable of further including one or two or more non-neighboring methylene groups other than those directly connected to $X_{11}'$ or $X_{12}'$ which can be replaced with at least one species of —O—,

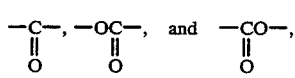

with proviso that $R_{13}$ and $R_{14}'$ respectively do not connect to a ring structure by a single bond when $R_{13}'$ and $R_{14}'$ respectively denote a halogenated alkyl group containing one methylene group replaced with —CH halogen—.

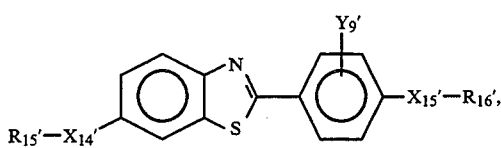

(IX)

wherein $Y_9'$ denotes H or F; $X_{14}'$ and $X_{15}'$ respectively denote —O—,

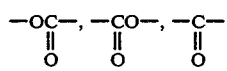

or a single bond; and $R_{15}'$ and $R_{16}'$ respectively denote a linear or branched alkyl group having 1-18 carbon atoms capable of including one or two or more non-neighboring methylene groups which can be replaced with —CH halogen— and capable of further including one or two or more non-neighboring methylene groups other than those directly connected to $X_{14}'$ or $X_{15}'$ which can be replaced with at least one species of —O—,

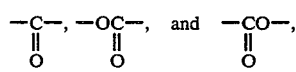

with proviso that $R_{15}$ and $R_{16}'$ respectively do not connect to a ring structure by a single bond when $R_{15}'$ and $R_{16}'$ respectively denote a halogenated alkyl group containing one methylene group replaced with —CH halogen—.

Further, preferred examples of $R_{15}'$ and $R_{16}'$ may respectively include those represented by the following groups i) to v):

i) a linear alkyl group having 1-15 carbon atoms;

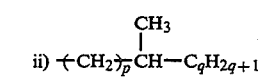

wherein p denotes an integer of 0-5 and q denotes an integer of 2-11 (optically active or inactive);

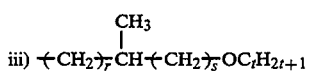

wherein r denotes an integer of 0-6, s denotes 0 or 1, and t denotes an integer of 1-14 (optically active or inactive);

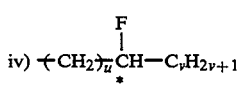

wherein u denotes an integer of 0 or 1 and v denotes an integer of 1-16; and

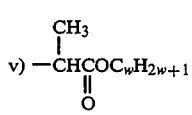

wherein w denotes an integer of 1-15 (optically active or inactive).

Preferred examples of the above mesomorphic compounds of the formulas (II)-(IX) may include those represented by the following formulas (IIa)-(IXb).

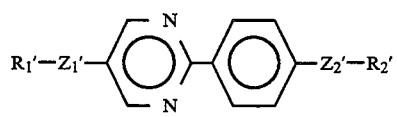
(IIa)

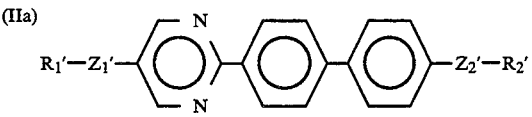
(IIb)

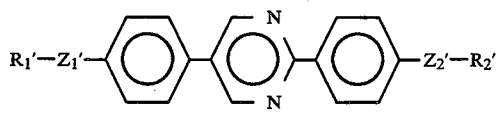
(IIc)

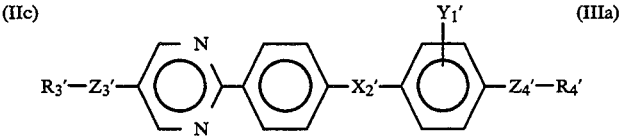
(IIIa)

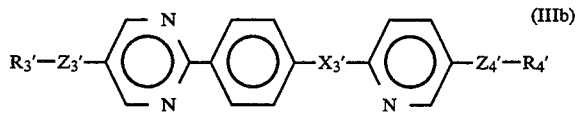
(IIIb)

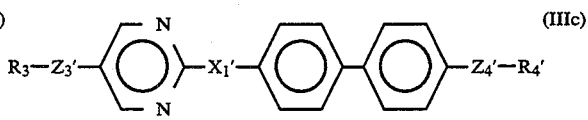
(IIIc)

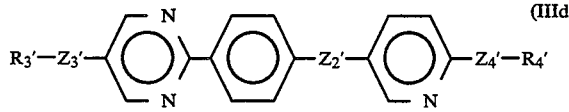
(IIId)

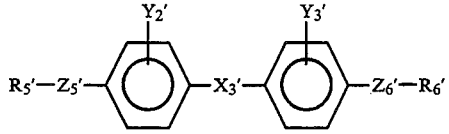
(IVa)

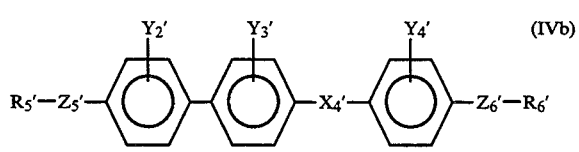
(IVb)

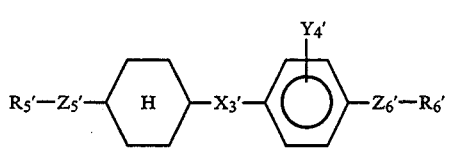
(IVc)

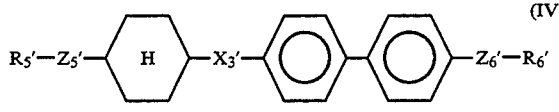 (IVd)
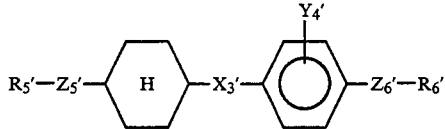 (IVe)
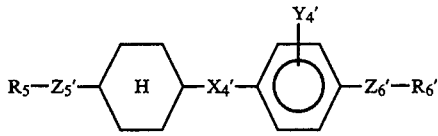 (IVf)
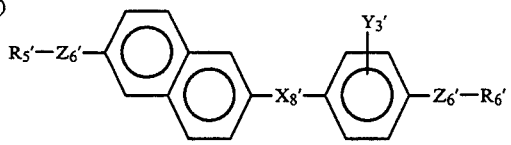 (IVg)
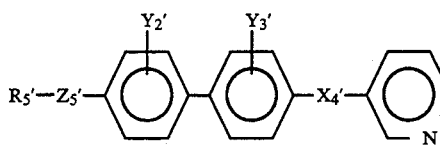 (IVh)
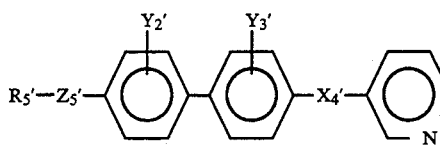 (IVi)
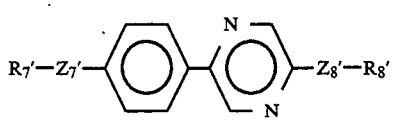 (Va)
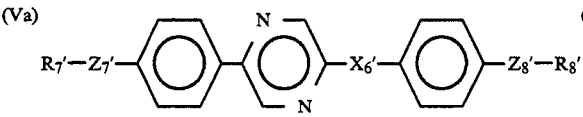 (Vb)
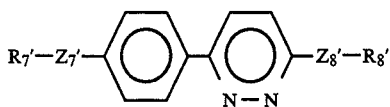 (Vc)
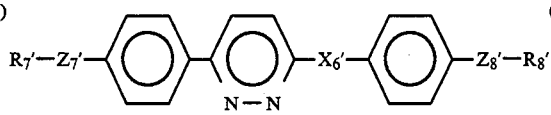 (Vd)
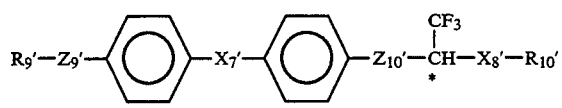 (VIa)
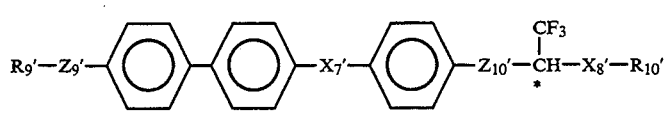 (VIb)
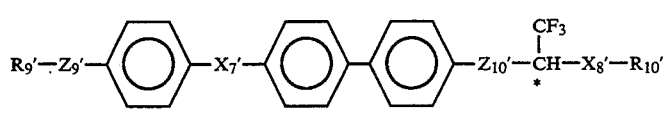 (VIc)
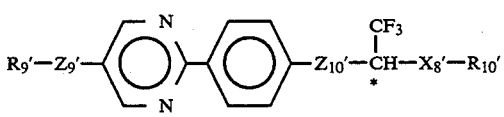 (VId)
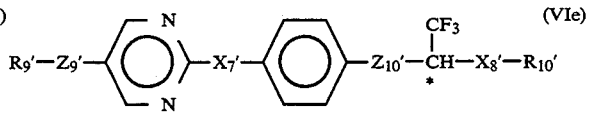 (VIe)
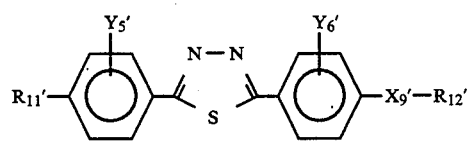 (VIIa)
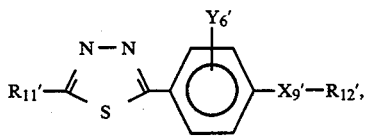 (VIIb)
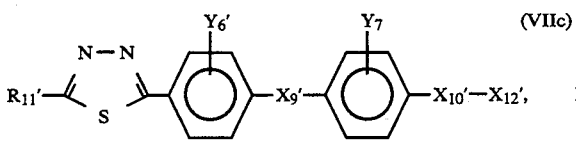 (VIIc)
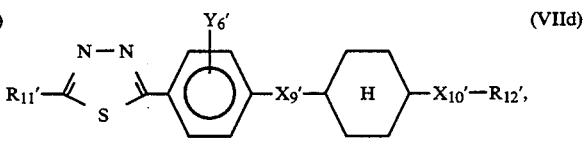 (VIId)
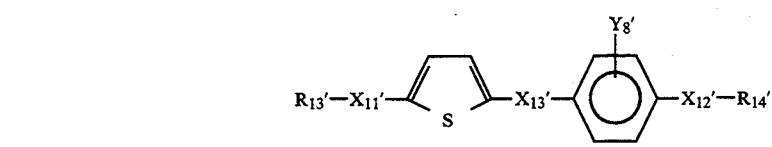 (VIIIa)

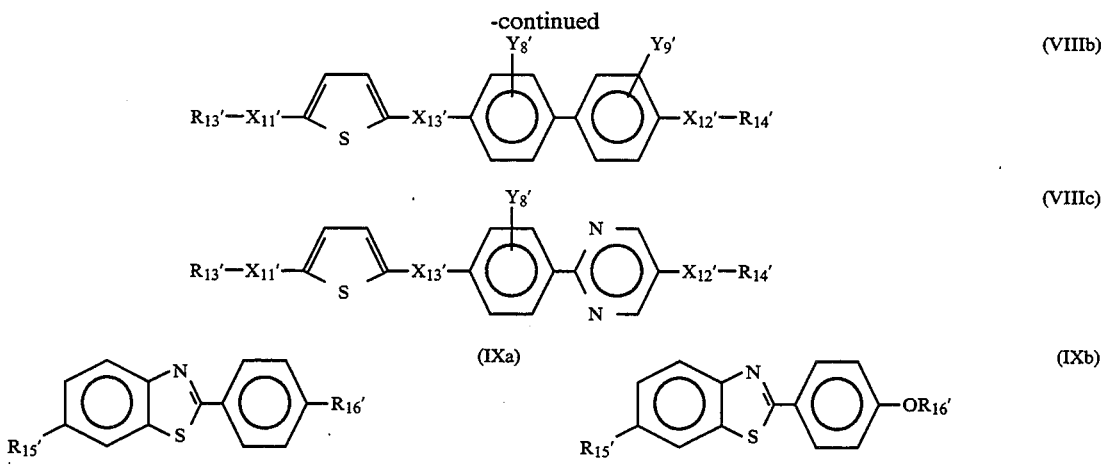

The liquid crystal device according to the present invention may preferably be prepared by heating the ferroelectric liquid crystal comprising the mesomorphic compounds of the classes (a), (b) and (c) described above into an isotropic liquid under vacuum, filling a blank cell comprising a pair of oppositely spaced electrode plates with the liquid crystal, gradually cooling the cell to form a liquid crystal layer and restoring the normal pressure.

Hereinbelow, an embodiment of a display apparatus according to the present invention will be explained.

Figure 11:
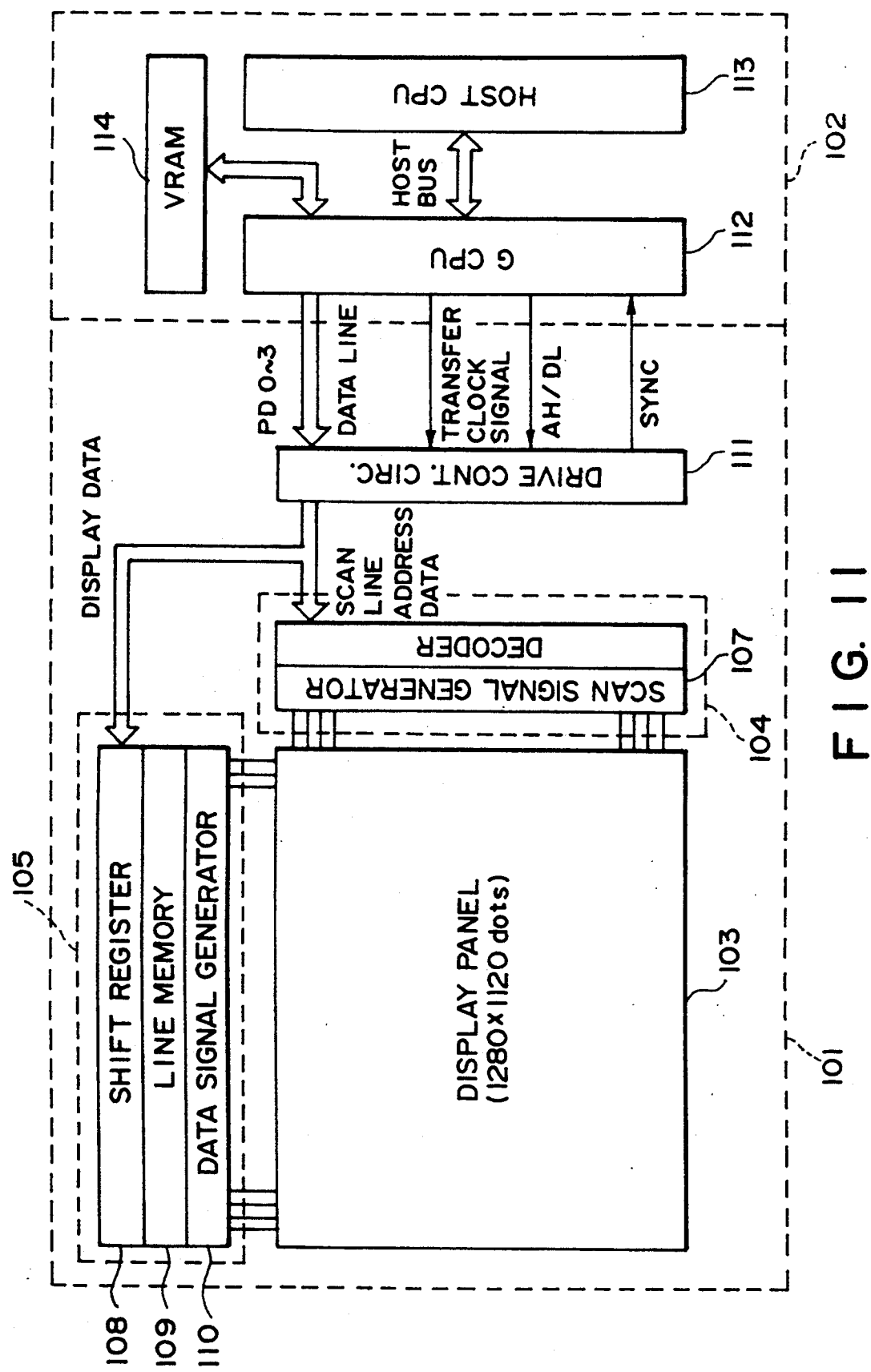
FIG. 11 is a block diagram showing a display apparatus comprising a liquid crystal device utilizing ferroelectricity of a liquid crystal and a graphic controller.
Figure 12:
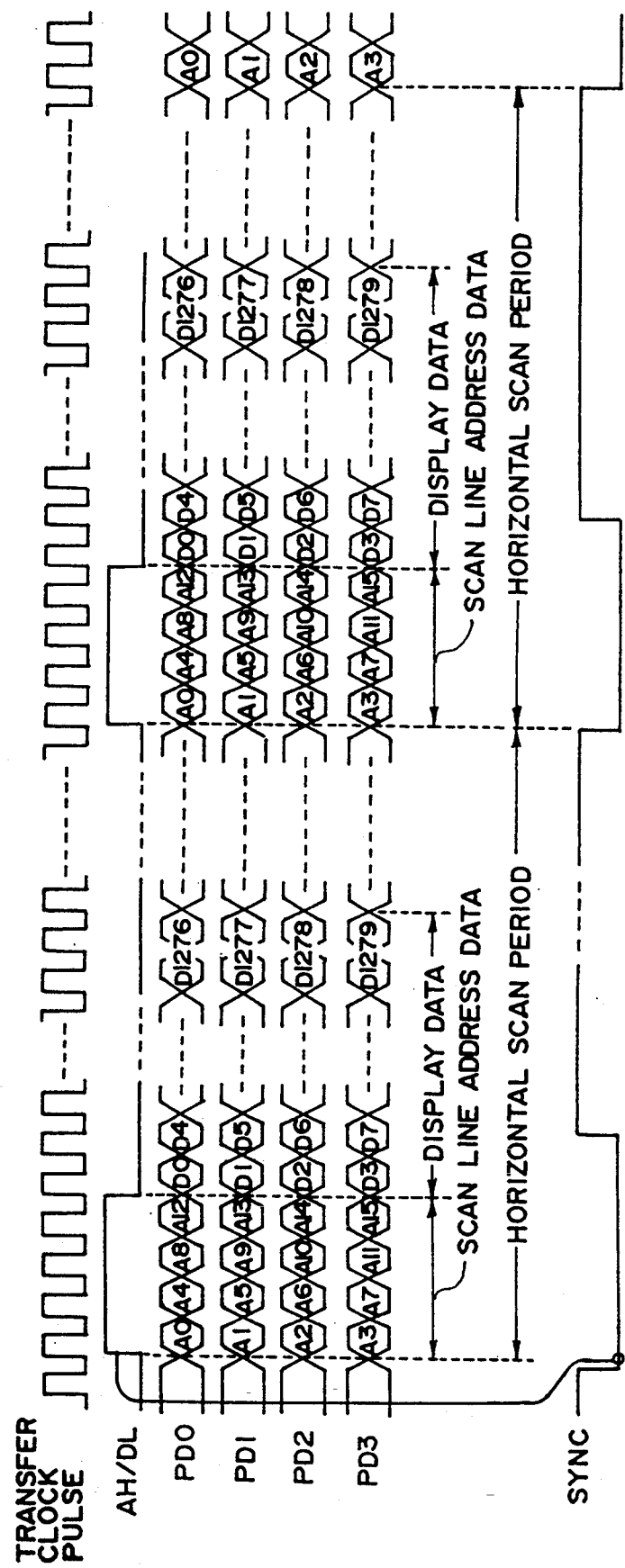
FIG. 12 is a time chart of image data communication showing time correlation between signal transfer and driving with respect to a display apparatus and a graphic controller.

Based on the arrangement and data format comprising image data accompanied with scanning line address data and by adopting communication synchronization using a SYNC signal as shown in FIGS. 10 and 11, there is provided a liquid crystal display apparatus of the present invention which uses the liquid crystal device according to the present invention as a display panel.

Referring to FIG. 10, the ferroelectric liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means shown in FIGS. 10 and 11. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally realized in the graphic controller 102. A light source is disposed at the back of the display panel 103.

The values of cone angle $\widehat{H}$, layer inclination angle $\delta$, pretilt angle G and apparent tilt angle $\theta a$ referred to herein are based on values measured according to the following methods.

Measurement of cone angle $\widehat{H}$

A liquid crystal device was sandwiched between right angle-cross nicol polarizers and rotated horizontally relative to the polarizers under application of a DC voltage of 10 V to 30 V between the upper and lower substrates of the device while measuring a transmittance through the device by a photomultiplier (available from Hamamatsu Photonics K.K.) to find a first extinct position (a position providing the lowest transmittance). Then, under application of a DC voltage having a reverse polarity, a second extinct position is found. A cone angle $\widehat{H}$ was measured as a half of the angle between the first and second extinct positions.

Measurement of apparent tilt angle $\theta a$

A liquid crystal device sandwiched between right angle cross nicol polarizes was supplied with a single pulse of one polarity exceeding the threshold voltage of a ferroelectric liquid crystal and was then rotated under no electric field horizontally relative to the polarizers to find a first extinction position. Then, the liquid crystal device was supplied with a single pulse of the opposite polarity exceeding the threshold voltage of the ferroelectric liquid crystal and was then rotated under no electric field relative to the polarizers to find a second extinct position. An apparent tilt angle $\theta a$ was measured as a half of the angle between the first and second extinct positions.

Measurement of layer inclination angle $\delta$

A layer inclination angle $\delta$ was measured by a method described in Clark and Largerwall et al., "Japan Display '86", Sep. 30–Oct. 2, 1986, pp. 456–458, or a method described in Ouchi et al., "J.J.A.P.", 27 (5), (1988), pp. L725–728. A rotating anode-type X-ray diffractometer using CuK$\alpha$ X-rays (available from MAC Science Co.) was used as a measurement apparatus. An 80 $\mu$m-thick glass ("Micro Sheet" available from Corning Co.) was used as a substrate glass in order to minimize X-ray absorption, otherwise an ordinary step of forming a cell was conducted.

More specifically, in order to obtain a gap between liquid crystal layers, a bulk liquid crystal was applied onto a sample glass. The gap was obtained by effecting $2\theta/\theta$ scan in the same manner as in powder X-ray diffraction analysis. A layer inclination angle $\delta$ was obtained in the following manner. A cell having a gap of 80 $\mu$m was prepared by using a pair of the above-mentioned 80 $\mu$m-thick glass substrates and a spacer comprising a 80 $\mu$m-thick glass identical to the above substrates. The cell was filled with a liquid crystal at a temperature of isotropic liquid and then gradually cooled while applying a magnetic field to the cell in the direction parallel to the substrates in an electromagnet, thus preparing a sample cell which had been subjected to a homogeneous alignment treatment. An X-ray detector was set to a diffraction angle 2θ providing the above-obtained layer gap and then the sample cell was subjected to θ scan, thus obtaining the layer inclination angle δ according to the above-mentioned method. The thus obtained layer inclination angle δ is inherent in the liquid crystal used and substantially excludes a cell thickness-dependence therefrom.

Measurement of pretilt angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

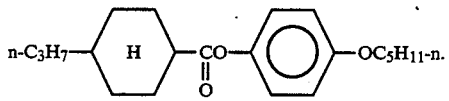

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

Hereinbelow, the present invention will be explained more specifically with reference to examples. It is however to be understood that the present invention is not restricted to these examples.

EXAMPLE 1

A liquid crystal composition A1 was prepared by mixing a class (a) compound, a class (b) compound and a class (c) compound, respectively shown in Table 1 below, in the respectively indicated proportions.

Similarly, a liquid crystal composition A1-N lacking the class (a) compound, a liquid crystal composition A1-NAC lacking the class (b) compound, and a liquid crystal composition A1-AC lacking the class (c) compound were prepared.

TABLE 1

| Ex. Comp. No. | | Wt. parts (converted wt. parts*[1]) | | | |
|---|---|---|---|---|---|
| | | A1 | A1-N | A1-NAC | A1-AC |
| Class (a) compound | | | | | |
| (29) | C₆H₁₃—⟨N=N⟩—⟨⟩—OC₁₀H₂₁ | 21.9 | 0 | 21.9 (46.7) | 21.9 (29.2) |
| Class (b) compound | | | | | |
| (31) | C₈H₁₇—⟨N=N⟩—⟨⟩—OC₁₀H₂₁ | 21.9 (28.0) | 21.9 | 0 | 21.9 (29.2) |
| (3) | C₈H₁₇—⟨N=N⟩—⟨⟩—OC₆H₁₃ | 15.6 (20.0) | 15.6 | 0 | 15.6 (20.8) |
| (4) | C₉H₁₉—⟨N=N⟩—⟨⟩—OC₆H₁₃ | 15.6 (20.0) | 15.5 | 0 | 15.6 (20.8) |
| Class (c) compound | | | | | |
| (19) | C₁₀H₂₁—⟨N=N⟩—⟨⟩—OC₈H₁₇ | 25.0 (32.0) | 25.0 (53.3) | 25 | 0 |

*[1]Wt. parts on the basis of 100 wt. parts of the resultant liquid crystal composition.

The thus-prepared liquid crystal composition A1, A1-N, A1-NAC and A1-AC showed the following phase transition series, respectively.

| Composition | Phase transition temperature (°C.) |
|---|---|
| A1 | Cry $\xrightarrow{6.2}$ SmC $\underset{53.2}{\longleftrightarrow}$ SmA $\underset{64.7}{\longleftrightarrow}$ N $\underset{69.5}{\longleftrightarrow}$ Iso |
| A1-N | Cry $\xrightarrow{9.8}$ SmC $\underset{54.7}{\longleftrightarrow}$ SmA $\underset{69.1}{\longleftrightarrow}$ N $\underset{70.7}{\longleftrightarrow}$ Iso |
| A1-NAC | Cry $\xrightarrow{25.0}$ SmC $\underset{56.4}{\longleftrightarrow}$ SmA $\underset{64.1}{\longleftrightarrow}$ N $\underset{68.9}{\longleftrightarrow}$ Iso |
| A1-AC | Cry $\xrightarrow{6.1}$ SmC $\underset{49.9}{\longleftrightarrow}$ SmA $\underset{57.1}{\longleftrightarrow}$ N $\underset{68.1}{\longleftrightarrow}$ Iso |

Then, a ferroelectric liquid crystal composition A2 was prepared by mixing the following compounds in the indicated proportions.

| Structural Formula | wt. parts |
|---|---|
| 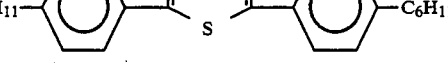 | 8.3 |
| 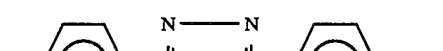 | 8.3 |
| 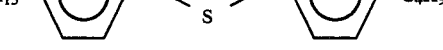 | 11.7 |
|  | 5.1 |
|  | 33.3 |
|  | 21.2 |
| 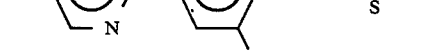 | 12.1 |

The above ferroelectric liquid crystal composition A2 showed the following phase transition series.

Phase transition temperature (°C.)

Cry $\xrightarrow{-17.6}$ SmC* $\underset{69.4}{\longleftrightarrow}$ SmA $\underset{80.7}{\longleftrightarrow}$ N $\underset{91.5}{\longleftrightarrow}$ Iso SmC*: chiral smectic C phase, and -continued Ch: cholesteric phase.

Four ferroelectric liquid crystal (FLC) A3, A3-N, A3-NAC and A3-AC were prepared by mixing the ferroelectric liquid crystal composition A2 with the liquid crystal compositions A1, A1-N, A1-NAC and A1-AC in the indicated proportions in Table 2 below, respectively. The ferroelectric liquid crystals A3, A3-N, A3-NAC and A3-AC showed the phase transition series indicated in Table 2.

TABLE 2

| FLC | Compositon (wt. parts) | | Phase transition temperature (°C.) |
|---|---|---|---|
| A3 | A1 (34) | A2 (66) | Cry $\xrightarrow{-16.1}$ SmC* $\xleftarrow{}_{59.4}$ SmA $\xleftarrow{}_{73.3}$ Ch $\xleftarrow{}_{80.8}$ Iso |
| A3-N | A1-N (34) | A2 (66) | Cry $\xrightarrow{-6.5}$ SmC* $\xleftarrow{}_{60.3}$ SmA $\xleftarrow{}_{75.2}$ Ch $\xleftarrow{}_{81.5}$ Iso |
| A3-NAC | A1-NAC (34) | A2 (66) | Cry $\xrightarrow{7.7}$ SmC* $\xleftarrow{}_{61.6}$ SmA $\xleftarrow{}_{73.3}$ Ch $\xleftarrow{}_{80.6}$ Iso |
| A3-AC | A1-AC (34) | A2 (66) | Cry $\xrightarrow{-22.3}$ SmC* $\xleftarrow{}_{58.5}$ SmA $\xleftarrow{}_{71.3}$ Ch $\xleftarrow{}_{81.4}$ Iso |

Two 1.1 mm-thick glass plates were provided and respectively coated with an ITO film to form an electrode for voltage application, which was further coated with an insulating layer of $Ta_2O_5$ by sputtering.

Further, each glass plate provided with an ITO film and treated in the above described manner was coated with a 1.0%-solution of polyimide resin precursor (LQ 1802, available from Hitachi Kasei K.K.) in N-methyl-2-pyrrolidone by a spinner coater rotating at 3000 rpm for 15 second. Thereafter, the coating film was subjected to heat curing at 270° C. for 60 min. to about 200 Å-thick film. The coating film was subjected to rubbing with acetate fiber-planted cloth, followed by washing with isopropyl alcohol. After silica beads with an average particle size of 1.5 microns were dispersed on one of the glass plates, the two glass plates were applied to each other with a 2 cm square-sealing plate and a bonding sealing agent (Struct Bond, available from Mitsui Toatsu K.K.) so that their rubbed directions were parallel to each other and heated at 150° C. for 60 min. After heating, the glass plate was cut off at the periphery of the sealing plate to form a 2 cm square-blank cell having a thickness of about 1.5 microns. The blank cell showed a pretilt angle of 12 degrees.

Then, each of the FLCs or FLC composition A3, A3-N, A3-NAC, A3-AC and A2 prepared above was heated into an isotropic liquid, and injected into the above prepared cell and, after heat-treating at 100° C. for 3 hours, was gradually cooled at a rate of 20° C./hour to 25° C. to prepare a liquid crystal device (LCD-A3, LCD-A3-N, LCD-A3-NAC, LCD-A3-AC, and LCD-A2).

The above-prepared liquid crystal devices were respectively subjected to observation of an alignment state in the cell by means of a polarizing microscope at 25° C. The liquid crystal device using the ferroelectric liquid crystal composition A2 showed C1 alignment over the entire device area. The C1 alignment included a splay alignment state and a uniform alignment state wherein the splay alignment state was rich. The liquid crystal device using the ferroelectric liquid crystal A3-N showed C1 alignment including a uniform alignment state almost over the entire device area and a slight splay alignment state. Other liquid crystal devices using the FLCs A3, A3-NAC and A3-AC showed C1 alignment including a uniform alignment state over the entire device area. Among the liquid crystal devices using the FLCs A3, A3-N, A3-NAC and A3-AC, a uniform alignment characteristic of the liquid crystal device using the ferroelectric liquid crystal A3-N is somewhat inferior to others. This may be attributable to a difference in an injection property to the blank cell with a high pretilt-alignment film due to a narrowed temperature range of a cholesteric phase and a lack of the class (a) compound. The liquid crystal device using the FLC composition A2 also shows a different alignment state from others. This may be attributable to a lack of the class (a) compound, the class (b) compound and the class (c) compound.

The resultant liquid crystal devices were respectively subjected to measurement of a contrast ratio and an optical response time (time from voltage application until the transmittance change reaches 90 of the maximum under the application of a peak-to-peak voltage Vpp of 20 V in combination with right-angle cross-nicol polarizers). The results are shown in the following Table 3.

TABLE 3

| Liquid crystal device (liquid crystal) | Response time (μsec) | | | | Temperature characteristic 10° C./50° C. | Contrast 30° C. |
|---|---|---|---|---|---|---|
| | 10° C. | 30° C. | 40° C. | 50° C. | | |
| LCD-A3 (A3) | 240 | 114 | 74 | 50 | 4.8 | 50:1 |
| LCD-A3-N (A3-N) | 213 | 106 | 70 | 45 | 4.7 | 40:1–49:1*[1] |
| LCD-A3-NAC (A3-NAC) | 279 | 126 | 86 | 60 | 4.7 | 48:1 |
| LCD-A3-AC (A3-AC) | 290 | 124 | 82 | 53 | 5.5 | 50:1 |
| LCD-A2 (A2) | 291 | 92 | 58 | 47 | 6.2 | 18:1–26:1*[1] |

*[1]: A clear contrast ratio could not be obtained since a region including a mixed state of a splay alignment state and a uniform alignment was observed.

Further, the liquid crystal devices were subjected to measurement of a cone angle $\theta$, a layer inclination angle $\delta$ and an apparent tilt angle $\theta a$ by the above-mentioned method. The results are shown in the following Table 4.

TABLE 4

| Liquid crystal device | $\theta$ (deg.) (at 30° C.) | $\delta$ (deg.) (at 30° C.) | $\theta a$ (deg.) (at 30° C.) | $\theta < a + \delta$*[1] | $\theta > \theta a > \theta/2$ |
|---|---|---|---|---|---|
| LCD-A3 | 18.1 | 12.5 | 13.8 | Satisfied | Satisfied |
| LCD-A3-N | 16.6 | 11.8 | 12.7 | Satisfied | Satisfied |
| LCD-A3-NAC | 19.5 | 13.7 | 14.2 | Satisfied | Satisfied |

TABLE 4-continued

| Liquid crystal device | θ (deg.) (at 30° C.) | δ (deg.) (at 30° C.) | θa (deg.) (at 30° C.) | $\theta < \alpha + \delta$*1 | $\theta > \theta a > \theta/2$ |
|---|---|---|---|---|---|
| LCD-A3-AC | 18.1 | 12.9 | 13.3 | Satisfied | Satisfied |
| LCD-A2 | 19.5 | 13.7 | 15.4 | Satisfied | Satisfied |

*1: α(pretilt angle) was 12 degrees.

EXAMPLE 2

Blank cell were prepared in the same manner as in Example 1 except that a 4 cm-square sealing plate and a 8 cm square-sealing plate were used instead of the 2 cm-square-sealing plate, respectively and the amount of silica beads was changed to 1.5 to 2 times thereof. Each of the blank cells has a thickness of about 1.5 microns over the almost entire cell area.

Then, each of the ferroelectric liquid crystals A3, A3-N, A3-NAC and A3-AC prepared in Example 1 was injected into the above-prepared cell in the same manner as in Example 1 to prepare a liquid crystal device, whereby an injection characteristic of each liquid crystal device was evaluated.

The liquid crystal devices were respectively subjected to measurement of a contrast ratio and an optical response time in the same manner as in Example 1, whereby the following results were obtained.

Device using FLC A3

C1 alignment including a uniform alignment state over the entire device area and good response characteristics (such as high-speed responsiveness and an improved temperature characteristic (i.e., a decreased temperature-dependence of response time (10° C./50° C.))) were obtained similarly as in Example 1. Further, a high contrast was also obtained similarly as in Example 1.

Device using FLC A3-N

A region showing a splay alignment state was enlarged as the cell size was enlarged (4×4 cm and 8×8 cm), thus resulting in a decrease in a uniformity of a contrast and an irregularity in response speed (i.e., an ununiform switching characteristic) in spite of the uniform cell thickness.

Device using FLC A3-NAC

As the cell size was enlarged (4×4 cm and 8×8 cm), a part not filled with the FLC was observed and enlarged in the four corner of the cell immediately after the injection of the FLC. The part not filled with the FLC somewhat remained after heating at 100° C. for 3 hours and gradual cooling. The remaining part filled with the FLC showed C1 alignment including a uniform alignment state over the entire remaining part. An irregularity in response speed was somewhat observed compared with that of the Device using FLC A3-N and was noticeable at a low temperature (10° C.).

Device using FLC A3-AC

As the cell size was enlarged (4×4 cm and 8×8 cm), a part not filled with the FLC was observed and enlarged in the four corner of the cell immediately after the injection of the FLC. The part not filled with the FLC disappear after heating at 100° C. for 3 hours and gradual cooling. The liquid crystal device showed C1 alignment including a uniform alignment state over the entire device area. An irregularity in response speed was slightly observed compared with that of the Device using FLC A3-NAC and was noticeable at 10° C.

The case of occurrence of the irregularity in response time is not clarified. However, this may be attributable to a cooling rate of the cell and various characteristics of the FLC used, such as a phase transition characteristic, a temperature range of a mesomorphic phase, an alignment characteristic and an injection characteristic (e.g., the presence of a part not filled with FLC).

COMPARATIVE EXAMPLE 1

Blank cells were prepared in the same manner as in Example 1 except that an alignment film (LP64, available from Toray K.K.) having a low pretilt angle (about 1 to 2 degrees) instead of the alignment film (LQ1802, available from Hitachi Kasei K.K.) having a high pretilt angle.

Then, each of the FLCs or FLC composition A3, A3-N, A3-NAC, A3-AC and A2 prepared in Example 1 was injected into the blank cell in the same manner as in Examples 1 and 2 to prepare a liquid crystal devices LCD-A3', LCD-A3'-N, LCD-A3'-NAC, LCD-A3'-AC and LCD-A3'-A2.

The thus-prepared liquid crystal cells were evaluated in the same manner as in Examples 1 and 2, whereby the following results (Table 5) were obtained.

TABLE 5

| | (Results of 2 cm square cell) | | | | | |
|---|---|---|---|---|---|---|
| Liquid crystal device | Response time (μsec) | | | | Temperature characteristic | Contrast |
| (liquid crystal) | 10° C. | 30° C. | 40° C. | 50° C. | 10° C./50° C. | 30° C. |
| LCD-A3' (A3) | 135 | 65 | 42 | 30 | 4.5 | 13:1 |
| LCD-A3'-N (A3-N) | 110 | 60 | 40 | 27 | 4.7 | 11:1 |
| LCD-A3'-NAC (A3-NAC) | 156 | 72 | 50 | 35 | 4.5 | 10:1 |
| LCD-A3'-AC (A3-AC) | 165 | 70 | 45 | 31 | 5.3 | 12:1 |
| LCD-A2' (A2) | 170 | 53 | 35 | 28 | 6.1 | 6:1–18:1*1 |

*1: A clear contrast ratio could not be obtained since a region including a mixed state of C1 alignment and C2 alignement.

All the liquid crystal devices showed a homogeneous splay alignment state in C2 alignment except that the liquid crystal device using the FLC composition A2 showed a mixed state of about 20–30% of a splay alignment state in C1 alignment and about 70–80% of a splay-alignment in C2 alignment. As shown in Table 5, differences in a response characteristic and a contrast due to a device structure were obtained, but differences in an injection characteristic and an irregularity in response speed due to cell sizes (2 cm, 4 cm and 8 cm) were not observed in all the liquid crystal devices used.

This may be because the liquid crystal devices having the low pretilt alignment film fails to improve the injection characteristic and the alignment characteristic of the FLC used. In other word, the FLC A3 containing the classes (a), (b) and (c) of compounds and the high pretilt alignment film used in combination in Examples 1 and 2 improves the injection characteristic and the alignment characteristic to the liquid crystal device.

As apparent from the above Examples 1 and 2 and Comparative Example 1, there is provided a liquid crystal device which is readily injection with FLC to show a good and homogeneous alignment state, a high-speed responsiveness over a broad temperature range including room temperature, and a decreased temperature-dependence of response speed, and also to provide a high contrast image with a high transmittance even in a large-area display device by employing the FLC A3 and the particular device structure which are features of the present invention.

EXAMPLE 3

Liquid crystal devices A5, A5-N, A5-NAC and A5-AC were prepared and evaluated in the same manner as in Example 1 except that an FLC composition A4 was used instead of the FLC A2 and was mixed with liquid crystal compositions A1, A1-N, A1-NAC and A1-AC in the proportions indicated in Table 6 below. The results are shown in Tables 5, 6 and 7 below. Further, the FLC composition A4 showed the following phase transition series.

Phase transition temperature (°C.)

$$Cry \xrightarrow{-26.0} S3 \xrightarrow{18.7}$$

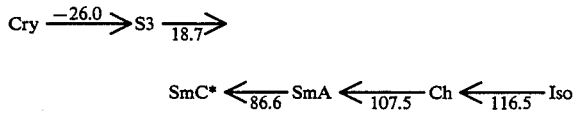

TABLE 8

| Liquid crystal device | $\theta$ (30° C.) | $\delta$ (30° C.) | $\theta a$ (30° C.) | $\theta < a + \delta$ | $\theta > \theta a > \theta/2$ |
|---|---|---|---|---|---|
| LCD-A5 | 14.9° | 10.6° | 11.6° | Satisfied | Satisfied |
| A5-N | 13.8° | 9.8° | 10.1° | Satisfied | Satisfied |
| A5-NAC | 16.4° | 11.8° | 12.2° | Satisfied | Satisfied |
| A5-AC | 15.8° | 11.5° | 10.9° | Satisfied | Satisfied |
| LCD-A4 | 13.6° | 9.7° | 11.6° | Satisfied | Satisfied |

EXAMPLE 4

Liquid crystal devices were prepared and evaluated in the same manner as in Example 2 except that the FLCs A5, A5-N, A5-NAC and A5-AC prepared in Example 3 were used instead of the FLCs A3, A3-N, A3-NAC and A3-AC.

As a result, the devices using the FLC A5 showed good performances and behavior were obtained or observed similarly as in the devices using the FLC A3 used in Example 2.

Further, the devices using the FLCs A5-N, A5-NAC and A5-AC were also similar in performances and behavior to those using the FLCs A3-N, A3-NAC and A3-AC used in Example 2, respectively.

EXAMPLE 5

Liquid crystal devices as a matrix display device were prepared and evaluated in the same manner as in Example 4 except that two glass plate provided with an electrode in the stripe form were applied to each other so that the direction of the stripes intersected at right angles to form picture elements at the intersection parts.

As a results, the tendencies of behavior and performances with respect to the liquid crystal devices used in Examples 2 and 4 became were pronounced, whereby the superiority of using the FLC containing the mesomorphic compounds of the formula (I) were more clarified.

This may be attributable to a considerable influence on an injection characteristic and an alignment characteristic of the liquid crystal devices due to a decrease in

TABLE 6

| FLC | Compositon (wt. parts) | | Phase transition temperature (°C.) |
|---|---|---|---|
| A5 | A1 (37) | A4 (63) | $Cry \xrightarrow{-9.1} SmC^* \xrightarrow{67.2} SmA \xrightarrow{88.6} Ch \xrightarrow{96.5} Iso$ |
| A5-N | A1-N (37) | A4 (63) | $Cry \xrightarrow{-5.2} SmC^* \xrightarrow{68.1} SmA \xrightarrow{90.2} Ch \xrightarrow{96.0} Iso$ |
| A5-NAC | A1-NAC (37) | A4 (63) | $Cry \xrightarrow{-3.0} SmC^* \xrightarrow{69.8} SmA \xrightarrow{88.6} Ch \xrightarrow{95.8} Iso$ |
| A5-AC | A1-AC (37) | A4 (63) | $Cry \xrightarrow{-6.9} SmC^* \xrightarrow{63.5} SmA \xrightarrow{85.8} Ch \xrightarrow{94.9} Iso$ |

TABLE 7

| Liquid crystal device (liquid crystal) | Response time (μsec) | | | | Temperature characteristic 10° C./50° C. | Contrast 30° C. |
|---|---|---|---|---|---|---|
| | 10° C. | 30° C. | 40° C. | 50° C. | | |
| LCD-A5 (A5) | 115 | 65 | 46 | 31 | 3.7 | 52:1 |
| LCD-A5-N (A5-N) | 83 | 54 | 40 | 27 | 3.1 | 45.1 |
| LCD-A5-NAC (A5-NAC) | 141 | 79 | 56 | 42 | 3.4 | 50:1 |
| LCD-A5-AC (A5-AC) | 143 | 70 | 51 | 34 | 4.2 | 52:1 |
| LCD-A4 (A4) | 288 | 42 | 30 | 26 | 11.1 | 23:1–28:1*[1] |

*[1]: A clear contrast ratio could not be obtained since a region including a mixed state of a splay alignment state and a uniform alignment was observed.

uniformity in rubbing treatment derived from unevenness of the surface of the substrate caused by forming the matrix structure.

COMPARATIVE EXAMPLE 2

Liquid crystal devices were prepared and evaluated in the same manner as in Comparative Example 1 except that the FLCs or FLC composition A3, A3-N, A3-NAC, A3-AC and A2 were replaced with those of A5, A5-N, A5-NAC, A5-AC and A4, whereby the results were similar to those in Comparative Example 1.

As described hereinabove, according to the present invention, there is provided a liquid crystal device which is readily injection with FLC to show a good and homogeneous alignment state, a high-speed responsiveness over a broad temperature range including room temperature, and a decreased temperature-dependence of response speed, and also to provide a high contrast image with a high transmittance even in a large-area display device by employing a specific FLC and the particular device structure which are features of the present invention. Further, a display apparatus including such a liquid crystal device can provide good display characteristics in combination with other components such as a light source and a drive circuit.

What is claimed is:

1. A liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the liquid crystal shows a pretilt angle $\alpha$, a cone angle $\text{\textcircled{H}}$, an inclination angle $\delta$ of SmC* layer, and an apparent tilt angle $\theta a$ satisfying relationships of: $\text{\textcircled{H}} < \alpha + \delta$ and $\text{\textcircled{H}} > \theta a > \text{\textcircled{H}}/2$; and the ferroelectric liquid crystal comprises at least three mesomorphic compounds represented by the following formula (I):

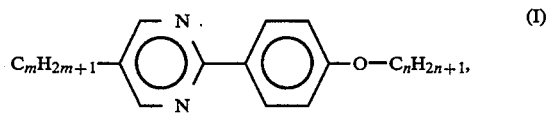

(I)

wherein m and n are an integer of 6 to 12, said at least three mesomorphic compounds including:

(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic phase.

2. A liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the ferroelectric liquid crystal shows a pretilt angle $\alpha$, a cone angle $\text{\textcircled{H}}$, and an inclination angle $\delta$ of SmC* layer, satisfying a relationship of: $\text{\textcircled{H}} < \alpha + \delta$, that the alignment state includes at least two states including a first stable state having an optical axis and a second stable state having an optical axis, and that, when the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at an appropriate angle of 3–30 degrees, which first color is identical to a second color provided by the second stable state when said one polarizer alone is rotated counterclockwise at the appropriate angle; and the ferroelectric liquid crystal comprises at least three mesomorphic compounds represented by the following formula (I):

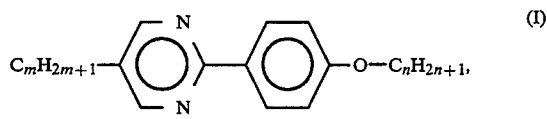

(I)

wherein m and n are integers of 6 to 12, said at least three mesomorphic compounds including:

(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic phase.

3. A liquid crystal device, comprising: a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction; wherein the ferroelectric liquid crystal is disposed in such an alignment state that the liquid crystal shows a pretilt angle $\alpha$, a cone angle $\text{\textcircled{H}}$ and an inclination angle $\delta$ of SmC* layer satisfying a relationship of: $\text{\textcircled{H}} < \alpha + \delta$, and that the alignment state includes a total of three or four stable states including two stable states having an extinction position showing a first transmittance and one or two stable states having an extinction position showing a second transmittance when combined with cross nicol polarizers, the first transmittance being lower than the second transmittance; and the ferroelectric liquid crystal comprises at least three mesomorphic compounds represented by the following formula (I):

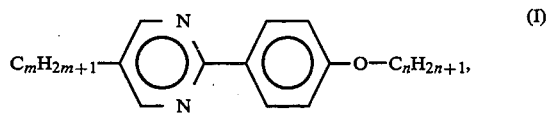

(I)

wherein m and n are integers of 6 to 12, said at least three mesomorphic compounds including:

(a) a mesomorphic compound showing a nematic phase and no smectic C phase;

(b) a mesomorphic compound showing a nematic phase and a smectic C phase; and (c) a mesomorphic compound showing a smectic C phase and no nematic phase, respectively on temperature decrease from a temperature of isotropic phase.

4. A liquid crystal device according to claim 3, wherein the alignment state includes a total of four stable states including first and second stable states having an optical axis and an extinction position showing a low transmittance and third and fourth stable states having an optical axis and an extinction position showing a relatively high transmittance when combined with a pair of right-angle cross nicol polarizers; when the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at an appropriate angle of 3–30 degrees which first color is identical to a second color provided by the second stable state when said one polarizer alone is rotated counterclockwise at the appropriate angle;

when the liquid crystal device is sandwiched between the pair of right-angle cross nicol polarizers such that one polarizer is aligned to have its absorption axis dividing an angle between the optical axes of the third and fourth stable states into equal halves and the other polarizer is aligned to have its absorption axis perpendicular to the absorption axis of said one polarizer, the third stable state provides a third color when said one polarizer alone is rotated clockwise at an appropriate angle of 3–30 degrees from said standard position, which third color is different from a fourth color provided by the fourth stable state when said one polarizer alone is rotated counterclockwise at the appropriate angle from said standard position.

5. A liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state including at least two stable states and having an inclination of forming a combination of a lightning defect and a hairpin defect generated in sequence along the direction of pretilt of liquid crystal molecules raising their forward ends up away from an adjacent one of the substrates, shows a cone angle $\widehat{H}$ and an apparent tilt angle $\theta a$ satisfying a relationship of: $\widehat{H} > \theta a > \widehat{H}/2$, and comprises at least three mesomorphic compounds represented by the following formula (I):

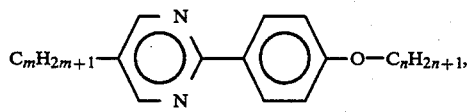

wherein m and n are integers of 6 to 12, said at least three mesomorphic compounds including:

(a) a mesomorphic compound showning nematic phase and no smectic C phase;

(b) a mesomorphic compound showning a nematic phase and a smectic C phase; and (c) a mesomorphic compound showing a smetic C phase and no nematic phase, respectively on temperature decrease from a temperature of isotropic phase.

6. A liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state which includes at least two stable states having an axis and has an inclination of forming a combination of a lightning defect and a hairpin defect generated in sequence along the direction of pretilt of liquid crystal molecules raising their forward ends up away from an adjacent one of the substrates, and comprises at least three mesomorphic compounds represented by the following formula (I):

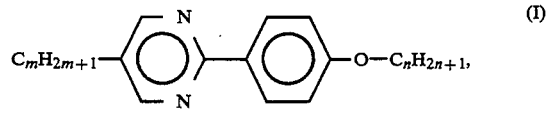

wherein m and n are integers of 6 to 12, said at least three mesomorphic compounds including:

(a) a mesomorphic compound showing a nematic phase and no smectic C phase;

(b) a mesomorphic compound showing a nematic phase and a smectic C phase; and (c) a mesomorphic compound showing a smectic C phase and no nematic phase, respectively on temperature decrease from a temperature of isotropic phase; and in case where the liquid crystal device is sandwiched between the pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at an appropriate angle of 3–30 degrees which first color is identical to a second color provided by the second stable state when said one polarizer alone is rotated counterclockwise at the appropriate angle.

7. A liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state having an inclination of forming a combination of a lightning defect and a hairpin defect generated in sequence along the direction of pretilt of liquid crystal molecules raising their forward ends up away from an adjacent one of the substrates, and comprises at least three mesomorphic compounds represented by the following formula (I):

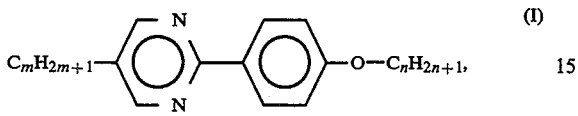

wherein m and n are integers of 6 to 12, said at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic phase; and the alignment state includes a total of three or four stable states including two stable states having an extinction position showing a first transmittance and one or two stable states having an extinction position showing a second transmittance when combined with cross nicol polarizers, the first transmittance being lower than the second transmittance.

8. A liquid crystal device according to claim 7, wherein the alignment state includes a total of four stable states including first and second stable states having an optical axis and an extinction position showing a first transmittance and third and fourth stable states having an optical axis and an extinction position showing a second transmittance when combined with a pair of right-angle cross nicol polarizers, the first transmittance being lower than the second transmittance; when the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at a first appropriate angle of 3-30 degrees, which first color is identical to a second color provided by the second stable state when said one polarizer alone is rotated counterclockwise at the first appropriate angle;

and when the liquid crystal device is sandwiched between the pair of right-angle cross nicol polarizers such that one polarizer is aligned to have its absorption axis dividing an angle between the optical axes of the third and fourth stable states into equal halves and the other polarizer is aligned to have its absorption axis perpendicular to the absorption axis of said one polarizer, the third stable state provides a third color when said one polarizer alone is rotated clockwise at a second appropriate angle of 3-30 degrees, which third color is different from a fourth color provided by the fourth stable state when said one polarizer alone is rotated counterclockwise at the second appropriate angle.

9. A liquid crystal device, comprising:
a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state including at least two stable states and having an inclination of forming a combination of a lightning defect and a hairpin defect generated in sequence along the direction of rubbing, shows a cone angle $\widehat{H}$ and an apparent tilt angle $\theta a$ satisfying a relationship of: $\widehat{H} > \theta a > \widehat{H}/2$, and comprises at least three mesomorphic compounds represented by the following formula (I):

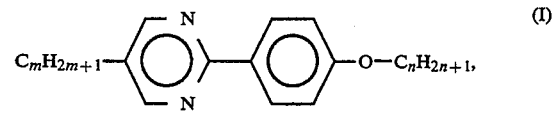

wherein m and n are integers of 6 to 12, said at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, respectively on temperature decrease from a temperature of isotropic phase.

10. A liquid crystal device, comprising:
a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state which includes at least two stable states having an axis and has an inclination of forming a combination of a lightning defect and a hairpin defect generated in sequence along the direction of rubbing, and comprises at least three mesomorphic compounds represented by the following formula (I):

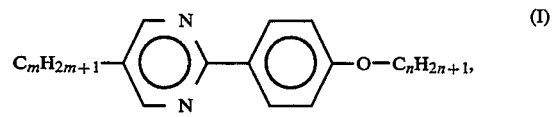

wherein m and n are integers of 6 to 12, said at least three mesomorphic compounds including:
(a) a mesomorphic compound showing a nematic phase and no smectic C phase;
(b) a mesomorphic compound showing a nematic phase and a smectic C phase; and (c) a mesomorphic compound showing a smectic C phase and no nematic phase, respectively on temperature decrease from a temperature of isotropic phase; and when the liquid crystal device is sandwiched between the pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at an appropriate angle of 3-30 degrees which first color is identical to a second color provided by the second stable state when said one polarizer alone is rotated counterclockwise at the appropriate angle.

11. A liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state having an inclination of forming a combination of a lightning defect and a hairpin defect generated in sequence along the direction of rubbing, and comprises at least three mesomorphic compounds represented by the following formula (I):

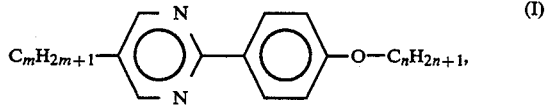

wherein m and n are integers of 6 to 12, said at least three mesomorphic compounds including:

(a) a mesomorphic compound showing a nematic phase and no smectic C phase;

(b) a mesomorphic compound showing a nematic phase and a smectic C phase; and (c) a mesomorphic compound showing a smectic C phase and no nematic phase, respectively on temperature decrease from a temperature of isotropic phase; and the alignment state includes a total of three or four stable states including two stable states having an extinction position showing a first transmittance and one or two stable states having an extinction position showing a second transmittance when combined with cross nicol polarizers, the first transmittance being lower than the second transmittance.

12. A liquid crystal device according to claim 11, wherein the alignment state includes a total of four stable states including a first and second stable state having an optical axis and an extinction position showing a first transmittance and third and fourth stable states having an optical axis and an extinction position showing a second transmittance when combined with a pair of right-angle cross nicol polarizers, the first transmittance being lower than the second transmittance;

such that where the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at a first appropriate angle of 3-30 degrees, which first color is identical to a second color provided by the second stable state when said one polarizer alone is rotated counterclockwise at the first appropriate angle;

and when the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the third stable state provides a third color when said one polarizer alone is rotated clockwise at a second appropriate angle of 3-30 degrees, which third color is different from a fourth color provided by the fourth stable state when said one polarizer alone is rotated counterclockwise at the second appropriate angle.

13. A liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state including at least two stable states and free from an alignment change accompanying a defect during a phase transition from a higher temperature phase to chiral smectic C phase on temperature decrease, shows a cone angle $\widehat{H}$ and an apparent tilt angle $\theta a$ satisfying a relationship of: $\widehat{H} > \theta a > \widehat{H}/2$, and comprises at least three mesomorphic compounds represented by the following formula (I):

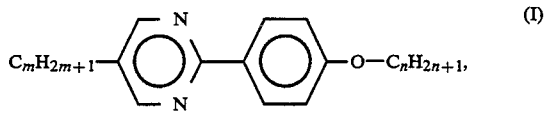

wherein m and n are integers of 6 to 12, said at least three mesomorphic compounds including:

(a) a mesomorphic compound showing a nematic phase and no smectic C phase;

(b) a mesomorphic compound showing a nematic phase and a smectic C phase; and (c) a mesomorphic compound showing a smectic C phase and no nematic phase, on temperature decrease from a temperature of isotropic phase.

14. A liquid crystal device, comprising:

a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;

wherein the ferroelectric liquid crystal is in an alignment state including at least two stable states and free from an alignment change accompanying a defect during a phase transition from a higher temperature phase to chiral smectic C phase on temperature decrease, comprises at least three mesomorphic compounds represented by the following formula (I):

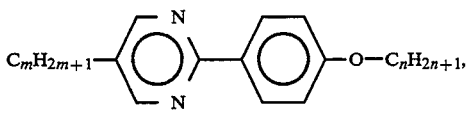

wherein m and n are integers of 6 to 12, said at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, on temperature decrease from a temperature of isotropic phase; and
in case where the liquid crystal device is sandwiched between the pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at an appropriate angle of 3–30 degrees from said standard position, which first color is identical to a second color provided by the second stable state when said one polarizer alone is rotated counterclockwise at the appropriate angle.

15. A liquid crystal device, comprising:
a pair of substrates, and a ferroelectric liquid crystal disposed between the substrates, each of the substrates having thereon an electrode for applying a voltage to the liquid crystal and a uniaxial alignment film provided with a uniaxial alignment axis, the alignment films on the pair of substrates being substantially parallel with each other and having an identical axis direction;
wherein the ferroelectric liquid crystal is in an alignment state including at least two stable states and free from an alignment change accompanying a defect during a phase transition from a higher temperature phase to chiral smectic C phase on temperature decrease,
comprises at least three mesomorphic compounds represented by the following formula (I):

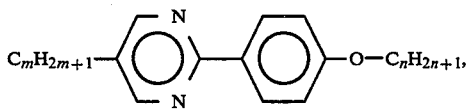

wherein m and n are integers of 6 to 12, said at least three mesomorphic compounds including:
(a) a mesomorphic compound showing a nematic phase and no smectic C phase;
(b) a mesomorphic compound showing a nematic phase and a smectic C phase; and
(c) a mesomorphic compound showing a smectic C phase and no nematic phase, on temperature decrease from a temperature of isotropic phase; and
the alignment state includes a total of three or four stable states including two stable states having an extinction position showing a first transmittance and one or two stable states having an extinction position showing a second transmittance when combined with cross nicol polarizers, the first transmittance being lower than the second transmittance.

16. A liquid crystal device according to claim 15, wherein the alignment state includes a total of four stable states including first and second stable states having an optical axis and an extinction position showing a first transmittance and third and fourth stable states having an optical axis and an extinction position showing a second transmittance when combined with a pair of right-angle cross nicol polarizers, the first transmittance being lower than the second transmittance; such that where the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the first stable state provides a first color when said one polarizer alone is rotated clockwise at a first appropriate angle of 3–30 degrees, which first color is identical to a second color provided by the second stable state when said one polarizer alone is rotated counterclockwise at the first appropriate angle;
and when the liquid crystal device is sandwiched between a pair of right-angle cross nicol polarizers such that one polarizer is aligned to have its absorption axis dividing an angle between the optical axes of the first and second stable states into equal halves and the other polarizer is aligned to have its absorption axis perpendicular to the absorption axis of said one polarizer, the third stable state provides a third color when said one polarizer alone is rotated clockwise at a second appropriate angle of 3–30 degrees, which third color is different from a fourth color provided by the fourth stable state when said one polarizer alone is rotated counterclockwise at the second appropriate angle.

17. A liquid crystal device according to any one of claims 1 to 3 and 13 to 15, wherein the alignment state includes totally three or four stable states free from a lightning defect and a hairpin defect.

18. A liquid crystal device according to claim 17, wherein the mesomorphic compound of (a), the mesomorphic compound of (b) and the mesomorphic compound of (c) are mixed in a weight ratio of 5:85:10 to 30:30:40, respectively.

19. A liquid crystal device according to claim 17, wherein the ferroelectric liquid crystal comprises 5 to 60 wt. % in total of said at least three mesomorphic compounds.

20. A display apparatus comprising a liquid crystal device according to claim 17, and voltage application means for driving the liquid crystal device.

21. A display apparatus according to claim 20, which further comprises a drive circuit.

22. A display apparatus according to claim 20 or 21, which further comprises a light source.

23. A liquid crystal device according to any one of claims 1 to 3 and 13 to 15, wherein the mesomorphic compound of (a), the mesomorphic compound of (b) and the mesomorphic compound of (c) are mixed in a weight ratio of 5:85:10 to 30:30:40, respectively.

24. A liquid crystal device according to any one of claims 1 to 3 and 13 to 15, wherein the ferroelectric liquid crystal comprises 5 to 60 wt. % in total of said at least three mesomorphic compounds.

25. A display apparatus comprising a liquid crystal device according to any one of claims 1 to 3 and 13 to 15, and voltage application means for driving the liquid crystal device.

* * * * *

UNITED STATES PATENT AND TRADEMARK OFFICE
CERTIFICATE OF CORRECTION

PATENT NO. : 5,422,748
DATED : June 6 1995
INVENTOR(S) : MASATAKA YAMASHITA, ET AL Page 1 of 6

It is certified that error appears in the above-indentified patent and that said Letters Patent is hereby corrected as shown below:

COLUMN 1

Line 10, "of" should be deleted;

Line 21, "of H phase" should read --or H phase--.

COLUMN 2

Line 50, "a a" should read --a--.

COLUMN 3

Line 43, "an" should read --one--.

COLUMN 4

Line 8, "G," should read --$\alpha$,--;

Line 21, "domain in" should read --domain 43 in--.

COLUMN 12

Line 55, "and $\delta$" should read --angle $\delta$--.

COLUMN 13

Line 37, "spray" should read --splay--; and

Line 60, "$\theta a^{uniform}$ (H)" should read --$\theta a^{uniform}$/ (H)--.

UNITED STATES PATENT AND TRADEMARK OFFICE
CERTIFICATE OF CORRECTION

PATENT NO. : 5,422,748

DATED : June 6 1995

INVENTOR(S) : MASATAKA YAMASHITA, ET AL

It is certified that error appears in the above-indentified patent and that said Letters Patent is hereby corrected as shown below:

COLUMN 14

Line 10, "(H)> $\theta$a > (H)2." should read --(H)> $\theta$a > (H)/2.

Line 47, "(upper" should read --(upper (--; and

Line 58, "a upper" should read --an upper--.

COLUMN 16

Line 28, "phase; Iso:" should read --phase: Iso:--.

COLUMN 17

Ex. Comp. No. (7) "$C_{12}H_{26}$" should read --$C_{12}H_{25}$--; and

Ex. Comp. No. (14) "$C_{12}H_{26}$" should read --$C_{12}H_{25}$--; and "$C_7H_{16}$" should read --$C_7H_{15}$--.

COLUMN 19

Ex. Comp. No. (23) "$C_7H_{16}$" should read --$C_7H_{15}$--; and

Ex. Comp. No. (28) "$C_{12}H_{26}$" should read --$C_{12}H_{25}$--.

COLUMN 21

Ex. Comp. No. (32) "$C_9H_{21}$" should read --$C_9H_{19}$--

Ex. Comp. No. (35) "$C_{10}H_{26}$" should read --$C_{12}H_{25}$--; and

Ex. Comp. No. (42) "$C_{12}H_{26}$" should read --$C_{12}H_{25}$--

UNITED STATES PATENT AND TRADEMARK OFFICE
CERTIFICATE OF CORRECTION

PATENT NO. : 5,422,748

DATED : June 6 1995

INVENTOR(S) : MASATAKA YAMASHITA, ET AL

It is certified that error appears in the above-indentified patent and that said Letters Patent is hereby corrected as shown below:

COLUMN 23

Ex. Comp. No. (48), "$C_{12}H_{26}$" should read --$C_{12}H_{25}$--; and

Ex. Comp. No. (49), "$C_{12}H_{26}$" should read --$C_{12}H_{25}$-- (both occurrences);

Line 59, "Parkinelmer" should read --Perkin-Elmer--; and

Line 66, "subjected" should read --subjecting--.

COLUMN 25

Line 68, "a2" should read --b1--.

COLUMN 26

Line 24, —COO," should read -- —COO;--.

COLUMN 29

Line 5, "$)_{\overline{m}} X_{19'}$" should read --$)_{\overline{m}} X_{10'}$--.

COLUMN 30

Line 64, "$R_{13}$" should read --$R_{13'}$--

COLUMN 31

Line 29, "$R_{15}$" should read --$R_{15'}$--.

COLUMN 35

Line 60, "angle G" should read --angle $\alpha$--.

UNITED STATES PATENT AND TRADEMARK OFFICE
CERTIFICATE OF CORRECTION

PATENT NO. : 5,422,748

DATED : June 6 1995

INVENTOR(S) : MASATAKA YAMASHITA, ET AL

It is certified that error appears in the above-indentified patent and that said Letters Patent is hereby corrected as shown below:

COLUMN 36

Line 30, "polarizes" should read --polarizers--; and

Line 44, "Largerwall" should read "Lagerwall--.

COLUMN 39

Line 24, "$C_6H_{11}$", both occurrences, should read --$C_5H_{11}$--.

COLUMN 40

Line 61, "crystal" should read --crystals--.

COLUMN 41

Line 24, "15 second." should read --15 seconds.--.

COLUMN 42

Line 41, "90" should read --90%--.

COLUMN 43

Line 11, "cell" should read --cells--; and

Line 14, "respectively." should read --respectively,--.

COLUMN 44

Line 14, "disappear" should read --disappeared--;

Line 37, "a" should be deleted; and

UNITED STATES PATENT AND TRADEMARK OFFICE
CERTIFICATE OF CORRECTION

PATENT NO. : 5,422,748
DATED : June 6 1995
INVENTOR(S) : MASATAKA YAMASHITA, ET AL It is certified that error appears in the above-indentified patent and that said Letters Patent is hereby corrected as shown below:

COLUMN 44, Cont'd.

Line 53, "6:1-18:1*¹" should read --6:1-8:1*¹--.

COLUMN 45

Line 4, "word," should read --words,--;

Line 11, "injection" should read --injected--; and

Line 28, "Tables 5, 6 and 7" should read --Tables 6, 7 and 8--.

COLUMN 46

Line 34, "results," should read --result,--; and

Line 36, "were" should read --more--.

COLUMN 47

Line 8, "composition" should read --compositions--;

Line 14, "injection" should read --injected--; and

Line 48, "an integer" should read --integers--.

COLUMN 49

Line 23, "degrees" should read --degrees,--;

Line 27, "when" should read --and when--.

UNITED STATES PATENT AND TRADEMARK OFFICE
CERTIFICATE OF CORRECTION

PATENT NO. : 5,422,748
DATED : June 6 1995
INVENTOR(S) : MASATAKA YAMASHITA, ET AL It is certified that error appears in the above-indentified patent and that said Letters Patent is hereby corrected as shown below:

COLUMN 50

Line 3, "showning" should read --showing--;

Line 5, "showning" should read --showing--; and

Line 57, "degrees" should read --degrees,--.

COLUMN 53

Line 15, "degrees" should read --degrees,--.

COLUMN 55

Line 39, "degrees from said standard position," should read --degrees,--.

COLUMN 56

Line 57, "totally" should read --a total of--.

Signed and Sealed this

Twenty-first Day of November, 1995

Attest:

BRUCE LEHMAN

Attesting Officer　　　　Commissioner of Patents and Trademarks